(12) United States Patent
Raynor et al.

(10) Patent No.: US 9,417,734 B2
(45) Date of Patent: Aug. 16, 2016

(54) MODULE FOR PROXIMITY AND GESTURE SENSING

(71) Applicant: STMicroelectronics (Research & Development) Limited, Marlow, Buckinghamshire (GB)

(72) Inventors: Jeffrey M. Raynor, Edinburgh (GB); Andrew Scott, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 386 days.

(21) Appl. No.: 13/942,859

(22) Filed: Jul. 16, 2013

(65) Prior Publication Data

US 2014/0027606 A1     Jan. 30, 2014

(30) Foreign Application Priority Data

Jul. 24, 2012 (GB) .................................. 1213136.3

(51) Int. Cl.
    *G01J 1/32*           (2006.01)
    *G06F 3/042*         (2006.01)
    (Continued)

(52) U.S. Cl.
    CPC .............. *G06F 3/0421* (2013.01); *G01S 17/026* (2013.01); *G01S 17/06* (2013.01);
    (Continued)

(58) Field of Classification Search
    CPC ......... G01J 1/42; G01J 1/4204; G01S 17/026; G01S 17/06; G01S 17/50; G01S 17/58; G01S 17/10; G01S 17/26; G06F 1/3231; G06F 3/017; G06F 3/0425; G06F 3/0426; G06F 3/0488; G06F 3/04883; G06F 3/0421; G06F 3/0304; G08B 13/19602; G08B 13/19608; G08B 13/1961; Y02B 60/1289

USPC .................. 250/221, 214 AL, 214; 345/175; 356/218; 382/103

See application file for complete search history.

(56) References Cited

U.S. PATENT DOCUMENTS 6,873,282 B1 * 3/2005 Murphy ................ G04F 10/005
                                                      341/164
9,127,942 B1 * 9/2015 Haskin ...................... G01C 3/08
(Continued)

FOREIGN PATENT DOCUMENTS

EP        2458484 A2     5/2012
GB        2487943 A      8/2012

OTHER PUBLICATIONS

UK-IPO Search Report for GB1213136.3 dated Nov. 20, 2012 (4 pages).

*Primary Examiner* — Georgia Y Epps
*Assistant Examiner* — Kevin Wyatt
(74) *Attorney, Agent, or Firm* — Gardere Wynne Sewell LLP

(57) ABSTRACT

A module operates in a proximity detection mode and a gesture detection mode. The module includes an illumination source, radiation sensors and a controller. When in proximity detection mode, the illumination source emits radiation, the radiation sensors measure the radiation level, and the controller adjusts the measured radiation level to substantially cancel the contribution attributable to ambient radiation to determine the presence of a proximate object by. When in the gesture recognition mode, the level of radiation incident on the sensors is individually sampled, and the controller determines object movement by comparing the changes in the measured radiation levels over a plurality of the samples. Ambient radiation contribution is not removed from the sampled radiation levels during the gesture recognition mode.

39 Claims, 17 Drawing Sheets

(51) Int. Cl.
  *G01S 17/02*  (2006.01)
  *G08B 13/196* (2006.01)
  *G06F 1/32*   (2006.01)
  *G01S 17/06*  (2006.01)
  *G01S 17/10*  (2006.01)
  *G06F 3/01*   (2006.01)
  *G06F 3/03*   (2006.01)

(52) U.S. Cl.
  CPC .............. *G01S 17/10* (2013.01); *G06F 1/3231* (2013.01); *G06F 3/017* (2013.01); *G06F 3/0304* (2013.01); *G08B 13/19608* (2013.01); *G06F 2203/04108* (2013.01)

(56) References Cited

U.S. PATENT DOCUMENTS

| | | |
|---|---|---|
| 2008/0122803 A1 | 5/2008 | Izadi et al. |
| 2008/0158175 A1* | 7/2008 | Hotelling ............. G06F 3/0418 345/173 |
| 2010/0245289 A1* | 9/2010 | Svajda ................. G06F 3/0421 345/175 |
| 2010/0294938 A1 | 11/2010 | Alameh et al. |
| 2011/0102378 A1 | 5/2011 | Kim et al. |
| 2011/0248151 A1* | 10/2011 | Holcombe ............ G01S 3/7803 250/221 |
| 2013/0182246 A1* | 7/2013 | Tanase .................. G06F 3/042 356/218 |

\* cited by examiner

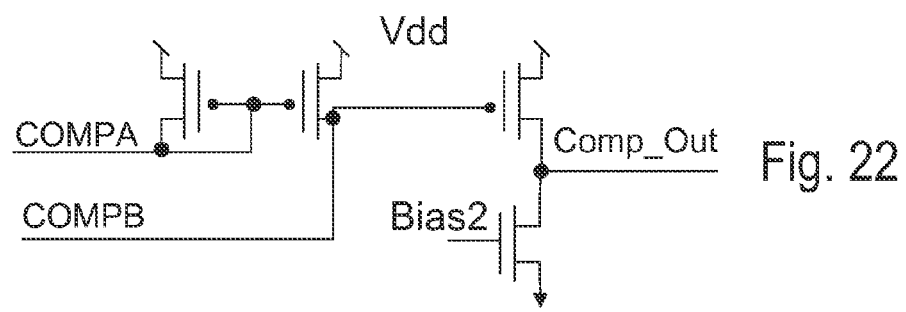
Fig. 22
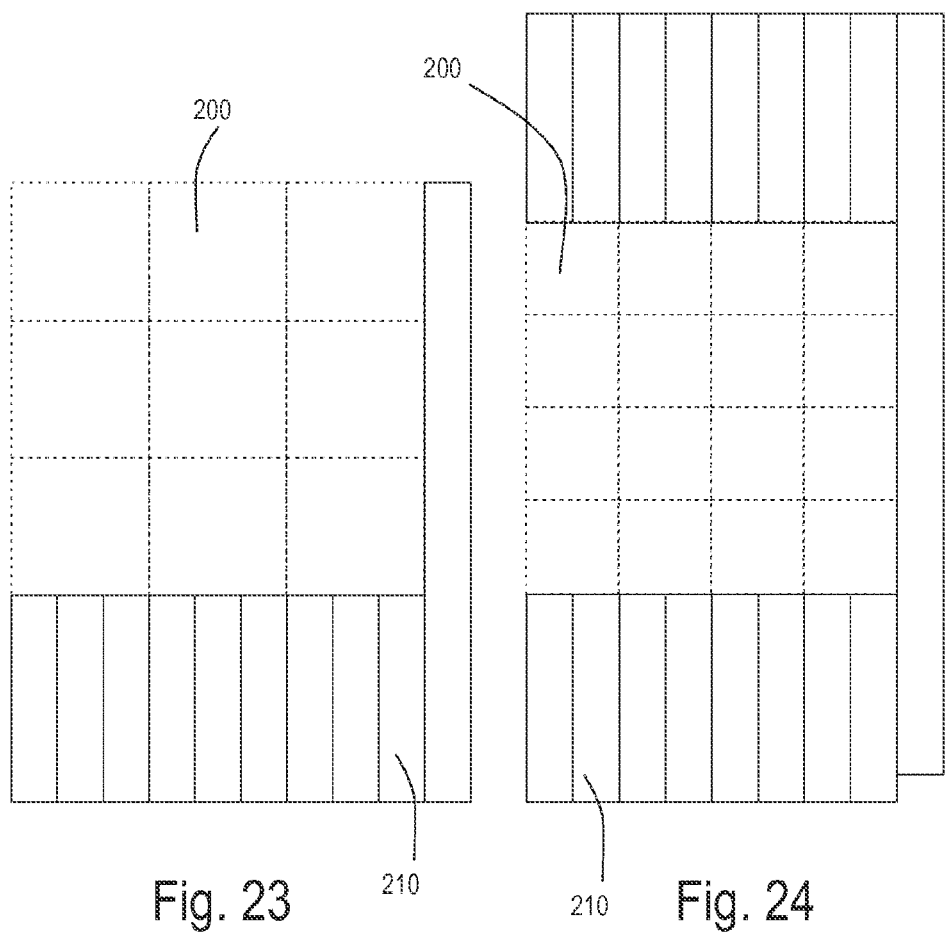
Fig. 23
Fig. 24

MODULE FOR PROXIMITY AND GESTURE SENSING

PRIORITY CLAIM

This application claims priority from Great Britain Application for Patent No. 1213136.3 filed Jul. 24, 2012, the disclosure of which is incorporated by reference.

TECHNICAL FIELD

The present invention relates to image sensors, and in particular to image sensors that are able to detect the proximity of an object and also to recognize gestures without touch.

BACKGROUND

Touch based user-interface systems are becoming more ubiquitous, for example mobile phones, tablets, ebook readers, GPS navigation systems, still and video cameras etc.

There are many different touch-screen technologies available, these provide sophisticated control over the device's operation, but require the user to touch the "touch screen". Although this is intuitive and provides for precise input (e.g. selecting one from 20 icons or widgets on a screen) there is a disadvantage, they require the user to touch the screen.

This leaves marks on the screen and under certain conditions more than other. For example, using an ebook reader to read a recipe in a kitchen when cooking (with hands covered in flour or dough), reading through a technical manual for a bicycle when there is grease on hands or in a sterile environment such as an operating theater to avoid contamination.

One problem with known non-contact gesture interfaces, is that they require a sensor module comprising plurality of photodetectors to detect the movement, but for various reasons (aesthetics, compactness etc.) the sensor should take up as small an area as possible. This results in each photodetector only receiving a small amount of light, particularly when the light level incident on the sensor is low.

It would be desirable to have a non-contact gesture interface while addressing the problem of low light levels over several detectors.

SUMMARY

In a first aspect there is provided a proximity and gesture detection module comprising: an illumination source; a plurality of radiation sensors; and a controller. Said module is operable in a proximity detection mode and a gesture detection mode. When the module is in said proximity detection mode: the illumination source is operable to emit radiation, one or more of said radiation sensors is/are operable to measure the level of radiation incident thereon, said level of radiation being attributable to ambient radiation and, when there is an object present in the field of said one or more of said radiation sensors, radiation from said illumination source which has been reflected by said object towards said one or more of said radiation sensors; and the controller is operable to determine for the presence of an object in the proximity of the module by adjusting said measured radiation level to cancel the contribution attributable to the ambient radiation, and comparing said adjusted radiation level to a proximity threshold. When said module is in said gesture recognition mode, it is operable to repeatedly sample the level of radiation incident on each of a plurality of said sensors, individually; the controller is operable to determine the movement of an object in the field of view of said sensors by comparing the changes in the measured radiation levels over a plurality of said samples. Any ambient radiation contribution is not removed from the sampled radiation levels during the gesture recognition mode.

In a second aspect there is provided a method of proximity detection and gesture recognition, comprising determining whether there is an object in the proximity of a sensor in a proximity detection mode, and following detection of an object, entering a gesture recognition mode. Said proximity detection mode comprises: emitting radiation from an illumination source, measuring the level of radiation incident on a plurality of sensors, said level of radiation being attributable to ambient radiation and, when there is an object present in the field of said one or more of said radiation sensors, radiation from said illumination source which has been reflected by said object towards said one or more of said radiation sensors; adjusting said measured radiation level to cancel the contribution attributable to the ambient radiation, and comparing said adjusted radiation level to a proximity threshold. Said gesture recognition mode comprises repeatedly individually sampling the level of radiation incident on a plurality of sensors; and determining the movement of an object in the field of view of said sensors by comparing the changes in the measured radiation levels over a plurality of said samples; wherein any ambient radiation contribution is not removed from the sampled radiation levels during said gesture recognition mode.

In a third aspect there is provided a pixel array comprising: a plurality of pixels; a first combined output line, wherein a first output of each pixel or subset thereof are all selectively connected to said first combined output line; each of said pixels also comprising a second output enabling each pixel to be read individually.

In a fourth aspect there is provided a program carrier comprising program instructions which, when run on suitable apparatus, cause said apparatus to perform the method of the second aspect of the invention.

BRIEF DESCRIPTION OF THE DRAWINGS

Embodiments will now be described, by way of example only, by reference to the accompanying drawings, in which:

FIG. 5b shows a detail of the lock-in amplifier shown in FIG. 5a;

FIG. 6 is a timing diagram showing typical output signal traces for the circuit of FIG. 5a;

FIG. 12 is a timing diagram showing an overview of the timing for the circuit of FIG. 11a;

FIG. 22 shows a typical circuit to which each of the pixels shown in FIGS. 21a and 21b may be connected;

FIG. 23 shows a first readout amplifier layout according to an embodiment of the invention;

FIG. 24 shows a second readout amplifier layout according to an embodiment of the invention.

DETAILED DESCRIPTION OF THE DRAWINGS

Figure 1:
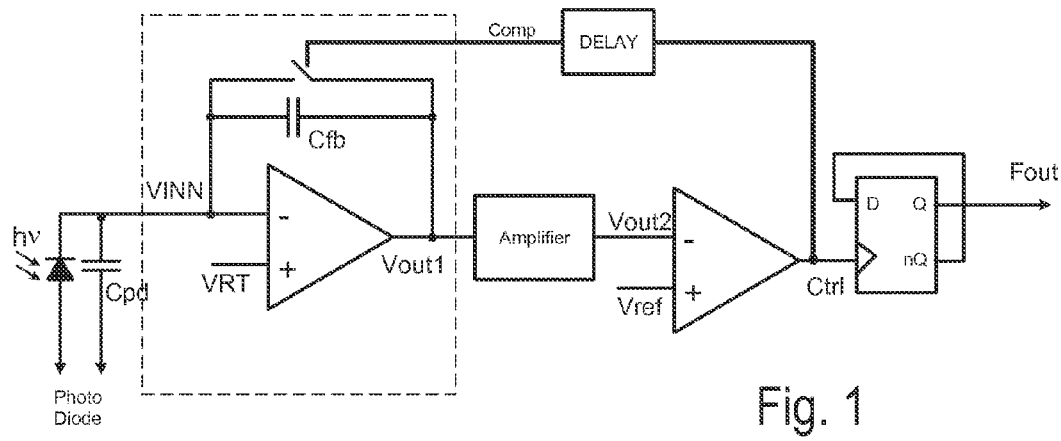
FIG. 1 shows an ambient light sensor circuit.

There are various touch screen technologies available. Resistive touch requires a hard press on the screen, and capacitive touch will work with a light touch (but still requires contact with the screen). Optical touch does not require an actual touch, but the user's finger is so close to the screen that it is difficult to avoid contact. It is possible to enlarge the thickness of the screen's bezel (for example 1 cm thick) so that the user's finger does not need to touch the screen, but this greatly adds to the thickness of the device which is cosmetically unattractive.

Resistive touch is lowest cost solution. It uses a sandwich comprising two electrically-resistive, flexible membranes with an insulator layer between them. Applying pressure to the screen allows one membrane to contact the other and a potential divider is formed and hence by applying a voltage and measuring the output voltage, the position of the touch can be produced.

It can be applied after manufacturing of the screen and therefore is low cost. Unfortunately, this technique is not suitable for multi-touch, i.e. two or more simultaneous touches. Multi-touch is a common requirement for gestures (pinch, squeeze, zoom etc.).

Capacitive touch is the most common technique as it is also a low cost solution while providing multi-touch capabilities. A grid of narrow parallel conductors is formed on one plane and another grid of parallel conductors is formed on a separate, but closely spaced plane. At the intersection a capacitance is formed. When a finger or other object is placed near the intersection, the electric field is deformed and hence the capacitance is changed. Typically the array is scanned, each horizontal and each vertical conductor is measured sequentially and so the position of the change of capacitance and therefore the position of the touch can be determined.

However, it is rather expensive as the conductors are narrow (to minimize optical degradation of the image) and so are susceptible to manufacturing defects. The conductors are integral to manufacture of the screen and so any failure of the touch system requires discarding both the touch system and the display.

Optical Touch is the oldest (1960s) and simplest technique. A number of light sources (e.g. light emitting diodes (LEDs)) are placed around two adjacent sides of the screen and a number of light detectors (e.g. photodiodes, photo-transistors or similar) are placed around the opposite sides. When a finger (or similar) is placed on the screen, the light is interrupted and can be detected. Such a system requires many LEDs and sensors (25 of each on a small 7" screen) and accurate placement of these sensors and also complex interconnections.

An alternative to having many LEDs and sensors is to use an imaging technique. This is the popular solution for large screens as it is easily scaled in size by using appropriate optics and for larger screens (>10"-15") is cheaper than capacitive touch. It is also suitable for multi-touch operation.

Typically, there are as many LEDs as sensors. The LEDs may be co-located with the sensor with a small displacement) and the light from the LED is reflected off a retro-reflector and returns to the sensor. Alternatively, the LED may be placed opposing the sensor and the light from the sensor passes through the sensor's imaging optics and onto the sensor's image plane.

In either case, without any object on the screen, the sensor is illuminated by the light from the LED and so produces a bright image across the whole sensor. If a finger (or similar) is placed on the screen, the object absorbs the light, the light beams are interrupted and so part of the sensor (corresponding to the location of the finger) is darkened. By determining the location of this darker region on the array, the position (in one dimension) of the finger can be accurately determined (either by using the knowledge of the optical path, for example by magnification or field of view of the lens, or by calibration of the system).

Optical finger mouse devices are common on many mobile phones and on some tablet keyboards. Typically they have an array of pixels (20×20 or 18×18) pixels.

They operate by illuminating a surface with IR (usually 850 nm) LED (typical LED current is 10 mA) and imaging the surface to detect the movement of the user's fingerprint minutia across the field of view. The field of view is typically only 1 mm×1 mm. Under normal usage the finger must be in direct contact to the sensor and although the technique would work with the user's finger hovering 1-2 mm above the surface, the optics is usually designed to avoid detecting this hovering motion to avoid accidental cursor movements.

In theory, it would be possible to use one of these sensors with a different optical system—one which observed a larger area of space at a greater distance from the screen, e.g. 1-5 cm. However there is a practical limitation of this technique. If the distance between the user's object (e.g. finger or hand) and the sensor (also light source) increases, the optical power at the detector drops as an inverse square of the distance. Further, as the optical field of view is increased, the illumination must be spread over a larger area and so the optical power reflected by the user's finger or hand back to the sensor also drops proportional to the field of view.

Therefore, if the user's finger or hand were to be 5 cm away from the sensor instead of 1 mm, and a field of view increased from 1 mm×1 mm to 5 cm×5 cm, the power from the LED must be increased by $(50\,mm/1\,mm)^2 \times (50/1) = 125{,}000$ times! If 10 mA LED current was sufficient for an optical finger mouse, then $125{,}000 \times 10\,mA = 1.25\,kA$ is required. This is unacceptable for a battery powered device.

Many portable devices incorporate ambient light sensors. As the display screen often consumes more power than the rest of the system, it is important to reduce this where possible. In low light environments (e.g. below 100 Lux) it is possible to dim the power supplied to the screen and still have an acceptable display. As the ambient light levels increase then power to the screen illumination is increased. After a certain ambient light level (e.g. bright sunlight of 10 k Lux) it is common not to increase the screen brightness further as the user is unable to perceive this change in the presence of such high light levels.

There are various methods to achieve this, such as that disclosed in European Patent Nos. 1659379 or 2306165, both of these disclosures being incorporated herein by reference. FIG. 1 also shows an example of an ALS circuit (Light to Frequency).

While it is the case that, if a user blocks the light to the ALS, the screen will dim, this is not a practical user input system. This is because such a system will not work in dark situations and the level of user control is extremely limited: on or off.

As described previously, the screen on a mobile device consumes a proportionally large amount of power. Further, in a touch-screen (especially capacitive touch which requires very little pressure to activate) it is important for a mobile phone to detect when it is held next to the user's ear and disable the touch screen and turn down or off the screen's brightness.

This is often achieved by employing a proximity sensor. There are two varieties of these: non-pulsed and pulsed.

Figure 2:
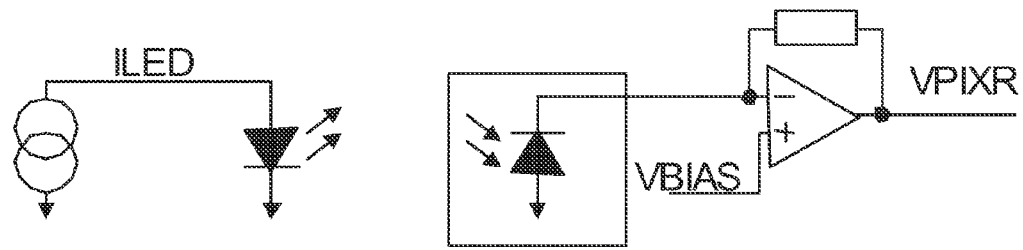
FIG. 2 shows a non-pulsed proximity sensor circuit using a trans-impedance amplifier.
Figure 3:
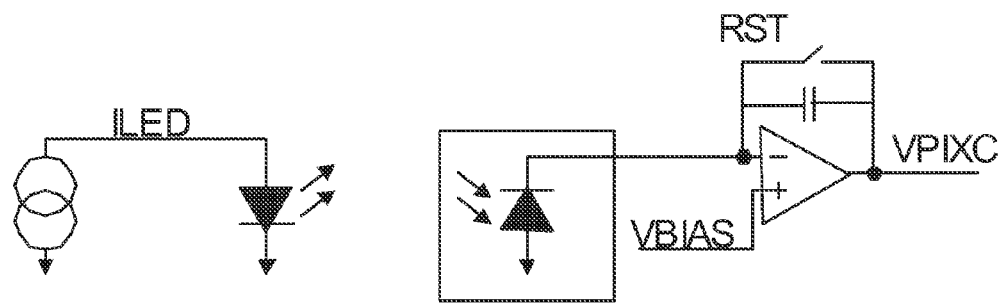
FIG. 3 shows a non-pulsed proximity sensor circuit using a charge integrator.

FIGS. 2 and 3 show an example of a non-pulsed system using respectively, a trans-impedance amplifier (op amp with resistor feedback) and a charge integrator. In such a system, a LED (usually IR so that it is invisible to the user) illuminates a cone of space, typically orthogonal to the device's screen and located near the device's loudspeaker, i.e. where the user would typically place their ear. When the ear is present, the ear will reflect a proportion of the IR light and this can be detected by the receiver.

Figure 4:
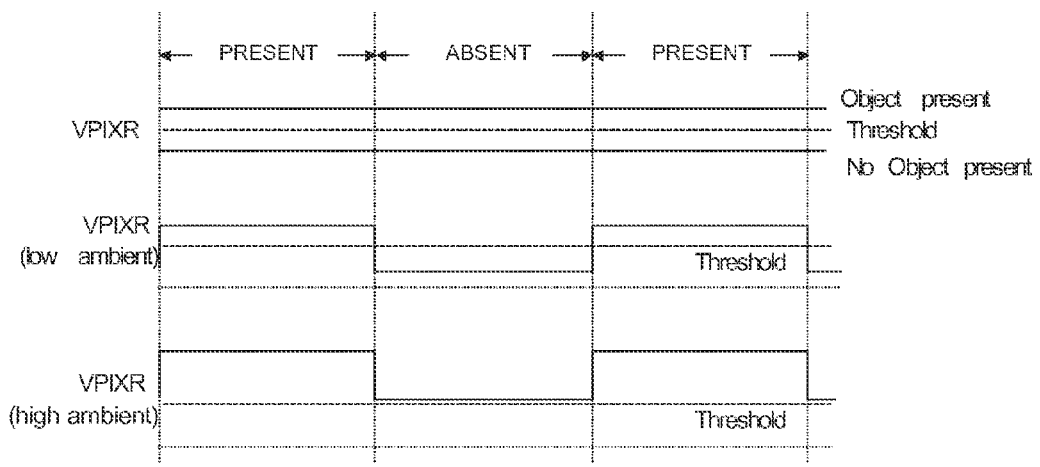
FIG. 4 is a timing diagram showing typical output signal traces for the circuit of FIG. 2.

FIG. 4 shows typical outputs for a single channel, non-pulsed system using a trans-impedance amplifier. It shows the output levels when an object is both present and absent, for low and high levels of ambient light.

When the voltage VPIXR is higher than a predetermined threshold, the presence of the object is detected. However, if there is a high level of ambient light levels, the voltage from the trans-impedance amplifier may exceed the threshold (as shown here), even in the absence of an object.

The problem with the non-pulsed technique is that the detector is sensitive to IR light from any source. Even with an optical band-pass filter which blocks visible light, there is a significant IR light from sunlight. The presence of this sunlight on the receiver would be the same as the reflected infrared (IR) light from the IR LED and cause the system to "think" that a user's ear was close to the device and consequently erroneously de-activate the touch screen and turn down the display illumination.

The common solution to this is to pulse the light (e.g. 30 kHz-500 kHz) and synchronize the detection such that the signal received when the LED is off is subtracted from the signal received when the LED is on. A simple modulation technique like this is able to mitigate the effect of ambient light as this will be at a constant level (at the pulse frequency) and so will be cancelled. Some artificial light sources, such as fluorescent lights are modulated at high frequencies (around the 30 kHz is common), so the modulation frequency of the detection system should be carefully chosen to avoid interference from light sources outside the portable device. Also, switching current on/off into a LED can produce unwanted radio-frequency interference, which is highly undesirable in a wireless communications device. Therefore, the frequency of the LED modulation should be chosen to minimize the effects. This may be done at design time by (for example) checking which frequencies cause least disturbance. Otherwise the frequency may be selected during operation of the device by programming the proximity detector to use a first frequency and detecting for the presence or absence of interference on the radio receiver. If interference is detected a different LED modulation frequency is selected, else the current LED modulation frequency is maintained.

Figure 5A:
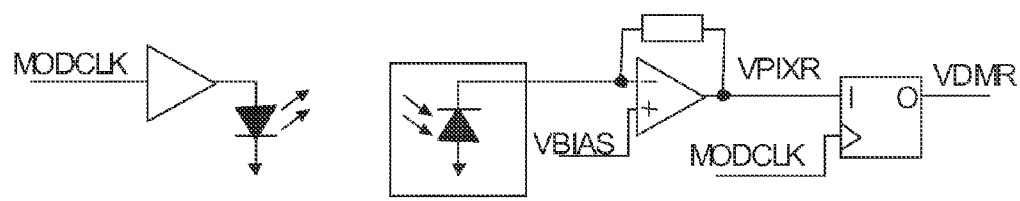
FIG. 5a shows a pulsed proximity sensor circuit using a trans-impedance amplifier.
Figure 5B:
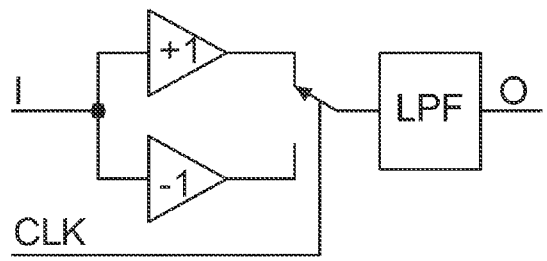
Figure 6:
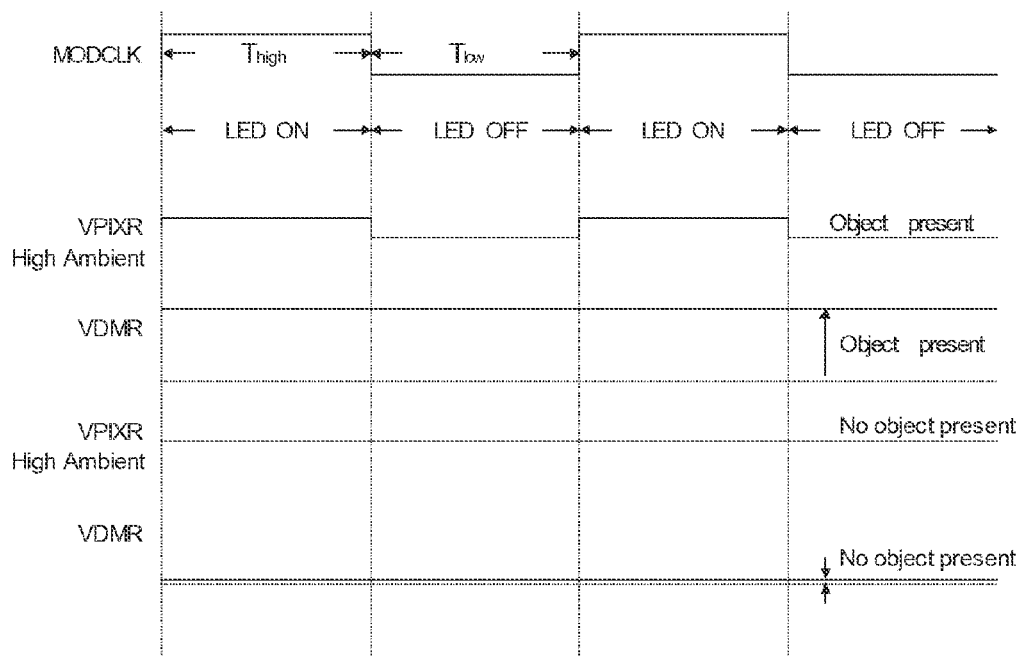

FIG. 5a shows a single channel, pulsed proximity detector using a trans-impedance amp and a lock-in amplifier. FIG. 5b is a detail of the lock in amplifier. FIG. 6 is a timing diagram for the circuit of FIG. 5a. Such a circuit can be used to mitigate the effect of ambient light as described in the preceding paragraph. In this example the LED is pulsed. As can be seen in FIG. 6, (VPIXR, object present), the ambient light levels cause a signal to be present on both phases (LED ON and OFF), while the presence of an object causes the signal to be higher when the LED is on. Using a lock-in amplifier after the trans-impedance amplifier allows the difference in the signal VPIXR (between phases of LED) to be detected (and amplified if necessary). Hence the output from the lock-in amplifier VDMR is high. The signal VIPIXR when no object is present, shows a high level signal (due to ambient light) but as this is constant, the output from the lock-in amplifier VDMR is low.

Figure 7A:
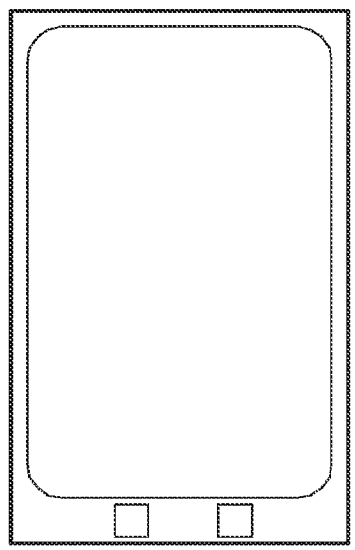
FIGS. 7a and 7b show a mobile phone device with respectively two and twelve proximity sensing modules, being able to sense gestures.
Figure 7B:
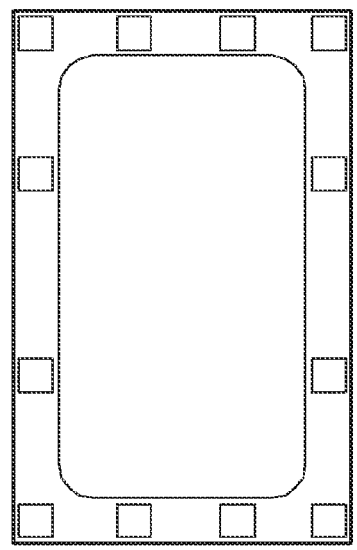

Pulsed IR light proximity detection systems are commonly found on mobile phones with large screens but can only be used to detect the proximity or presence of an object close (e.g. 0.5 cm to 10 cm) to the device. One technique to implement a low cost gesture detection system may be to employ multiple of these devices, spaced across the surface of the phone/tablet/ebook reader/camera etc. By detecting the presence of an object at one location, followed by the presence of the object at a second location with a pre-determined period of time (e.g. 1 second) would indicate that the user has moved their hand/finger in a pre-determined direction. FIGS. 7a and 7b show a mobile phone device with respectively two and twelve proximity sensing modules.

Two modules are only able to detect motion along a single axis. Employing the use of multiple devices (e.g. four), a more sophisticated system can be produced, for example ability to detect motion in two axes which permit a more complex and greater variety of input gestures to be recognized.

Figure 8A:
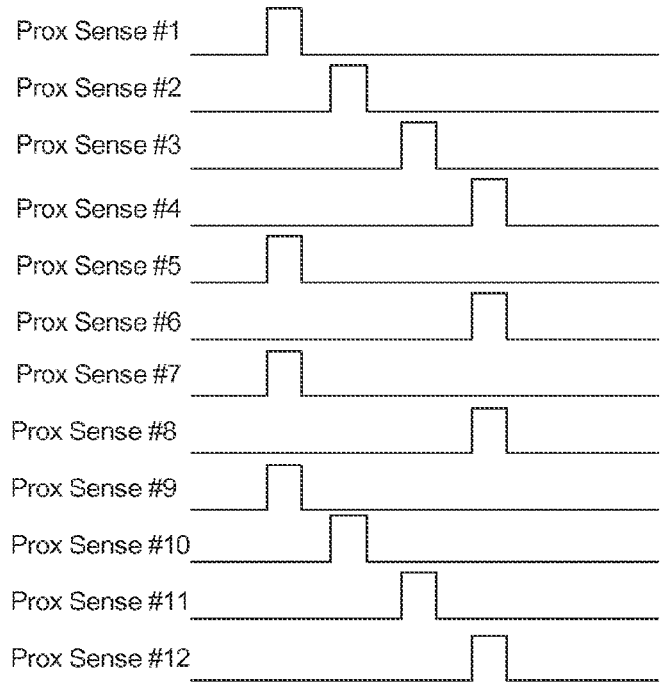
FIG. 8a shows the outputs of each of the twelve proximity sensing modules of FIG. 7b when an object moves left to right.
Figure 8B:
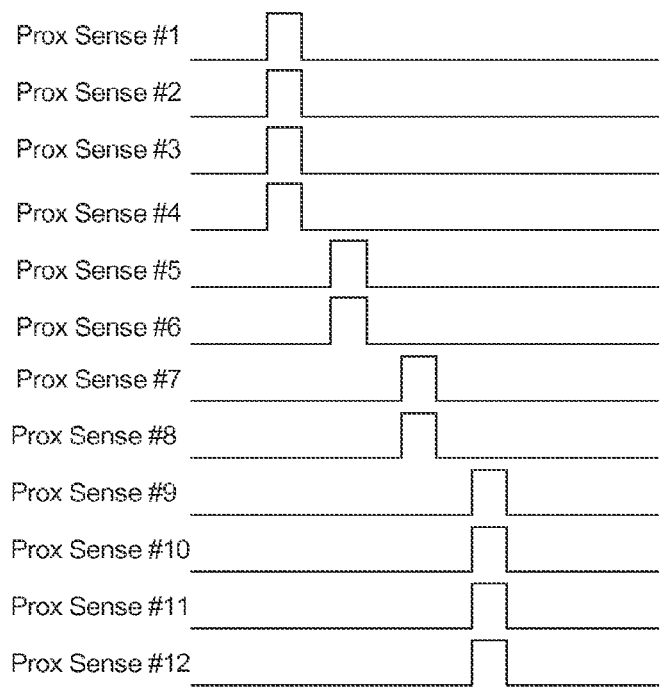
FIG. 8b shows the outputs of each of the twelve proximity sensing modules of FIG. 7b when an object moves top to bottom.

FIG. 8a shows the outputs of each of the twelve proximity sensing modules of FIG. 7b when an object moves left to right. The modules are numbered clockwise starting from the module in the top-left corner. When the object moves left to right a series of pulses are generated. The proximity sensing modules 1, 5, 7, 9 detect the object first (assuming that the movement is directly parallel to the arrangement of the proximity sensing modules). A while later proximity sensing modules 2 (at the top) and 10 (at the bottom) detect the presence of the object, followed by proximity sensing modules 3 (at the top) and 11 (at the bottom) detecting the presence of the object. Finally, modules 4, 6, 8 and 12 detect the object. The time between the detections (for example 1 & 2 or 9 and 10) indicate the speed of motion of the object. FIG. 8b shows the outputs of each of the twelve proximity sensing modules of FIG. 7b when an object moves top to bottom.

There are several disadvantages to this technique.

Many modules add to the cost of the system

Many modules add to the size of the system

Each optical module requires an optical aperture to allow the passage of light (both from the LED to the object and also back to the sensor). As well as adding to the cost of producing the housing, this is also aesthetically displeasing The signals modules must be connected to over a larger distance, to a (separate) processing unit—adding cost and size There are severe constraints as to where on the front (or rear!) of the phone/tablet/camera/GPS the multiple proximity sensing modules can be placed. It is not possible to put a proximity sensing module over the screen for examples. If the modules are placed at the corners of the screen, then the user needs to move their finger/hand over a larger distance for the movement to be detected. This can be inconvenient, tiring and unintuitive.

The signals (light reflected from a finger/hand) from each of the separate devices could interfere with each other—e.g. the light from module 1 could be detected by module 2.

Figure 9:
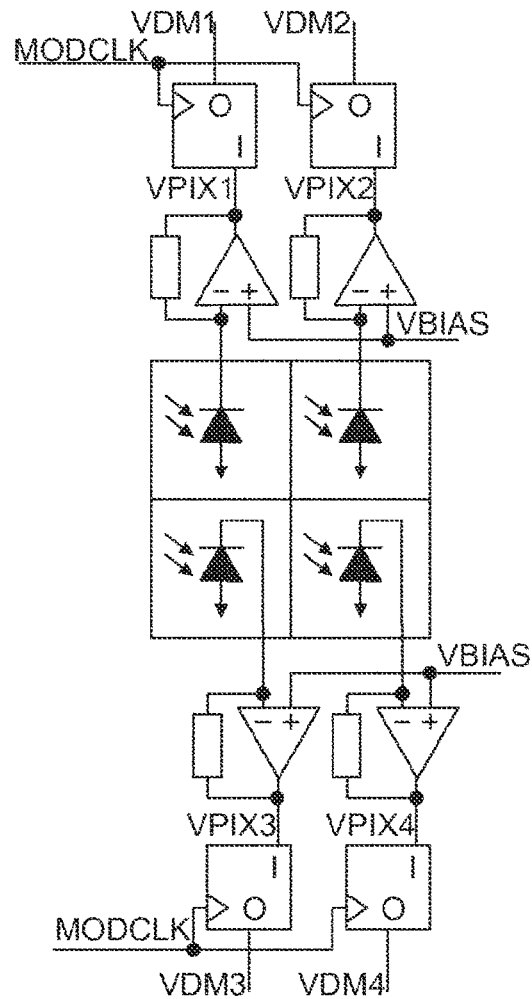
FIG. 9 shows a multi-channel proximity sensing circuit comprising trans-impedance amplifiers.

An alternative to using multiple modules is to combine the functionality into a single module. That is, to have one lens to direct the light from the LED into a cone above the phone/tablet/ebook reader/camera/GPS etc. and another lens to focus the light onto the multiple photo-detectors. FIG. 9 is a circuit diagram of a multi-channel proximity detector that may form the basis for such a single module, as it could be used to detect not only the presence of an object, but also movement of an object.

In FIG. 9, each photodiode is connected to its own trans-impedance amplifier (TIA). Typically all the resistors have the same values and all the non-inverting inputs are connected in common to a reference voltage VBIAS. The negative feedback operation of the TIA ensures that the inverting input is at the same voltage as the non-inverting input and hence all the photodiodes are maintained at approximately the same reverse bias voltage (the different input offset voltages of each of the op-amps will produce a slight variation in the photodiode bias voltages, but this can be ignored). The outputs of TIAs VPIX1, VPIX2, VPIX 3, VPIX4 are typically each connected to a lock-in amplifier. The lock-in amplifier typically adds the signal when the clock "MODCLK" is high and subtracts the signal when the clock "MODCLK" is low. This MODCLK is the same frequency (optionally phase shifted) to the pulse applied to the LED. Hence any ambient light (present on both phases of the clock) is subtracted and removed while the light from the LED (and reflected from an object) is transmitted to the next stage.

FIG. 9 shows an arrangement having as many lock-in amplifiers as TIAs. Optionally, there is only one lock-in amplifier which is multiplexed between all the TIA. however, this is less desirable as it would need to store many signals (e.g. the four VPIXx signals when MODCLK is high and 4 VPIXx when MODCLK is low).

The output voltage will equal VBIAS+the detector output current (Iphoto)×the feedback resistance (Rfeedback). For example, if VBIAS=1V, Rfeedback=10 kΩ and Iphoto=10 μA, then the output voltage VPIX will be 2V.

If less light falls on the photodiode, then proportionally less photocurrent will be produced. The same voltage swing can be produced by increasing the feedback resistor. For example if the photocurrent is 100 nA, then a value of Rfeedback of 1 MΩ will also produce an output voltage on VPIX of 2V. However there are several disadvantages with this. Firstly a large feedback resistor produces more noise and secondly it takes up much more area on an integrated circuit.

Figure 10:
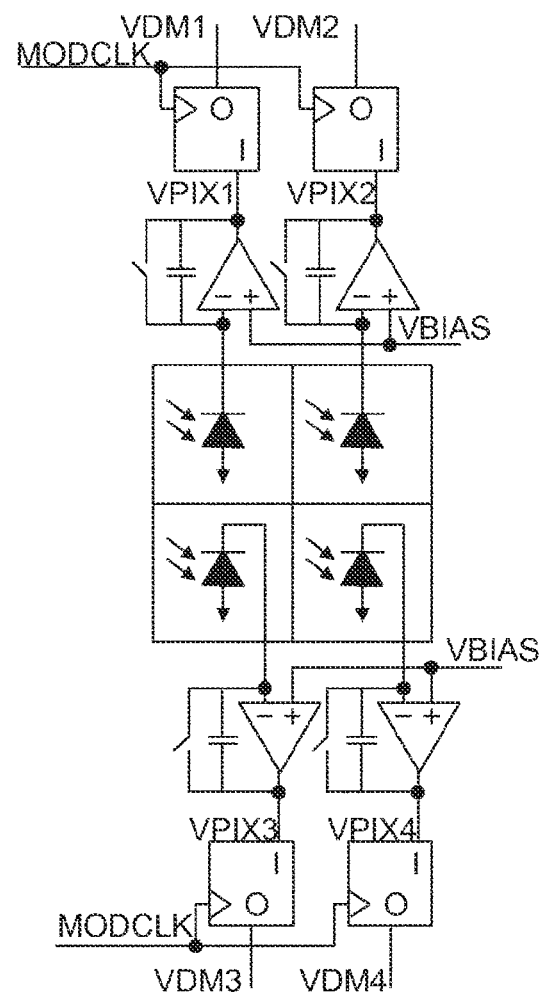
FIG. 10 shows a multi-channel proximity sensing circuit comprising charge integrators.

Hence if the photocurrent is lower than 1 μA a charge integrator technique is preferred. Such an arrangement is shown in FIG. 10. This uses a feedback capacitance (with parallel reset switch) in place of the resistance of the FIG. 9 example. For such an arrangement, it can be shown that the smaller the capacitance, the larger the output swing. For example, 10 nA photo current into a charge integrator which has a 210 fF feedback capacitor integrating for 10 μs will produce a 0.476V swing.

The output of a charge integrator is time-varying. If this is problematic, then a sample-hold circuit can be employed to produce a stable voltage. The lock-in amplifier is shown separate to the charge integrator. It is possible to combine the charge integrator and lock-in amplifier.

FIGS. 9 and 10 show a detector array comprising four detectors. Having multiple detectors permits the movement of the object, i.e. gesture detection, but brings significant problems. The greater the number of detectors, the more accurate and reliable is the gesture/movement detection. For example, 9 or 16 channel devices with 9 or 16 detectors in a square array may be provided. Other shape arrays and arrangements are also possible. However, where there are more detectors, the incoming light is divided among a greater number of detectors and so each detector receives a proportionately smaller amount of light.

If this module is only performing proximity sensing/gesture detection, then the optical aperture can be fabricated with a filter which transmits only IR light and blocks visible light and so is not noticeable to the user. However, it is common to combine the functionality of an ALS with proximity sensing (to reduce space, cost and number of apertures). This means that a different aperture is required which passes a small amount of visible light for the ALS to work correctly. As a consequence of this, there is often significant attenuation of the IR signal. Also, the modulation frequency of the LED is typically higher than 10 kHz, which reduces the time available for light collection as well as complicating the design of high-speed analogue switching circuits.

For example, if the photocurrent is 10 pA and the integration time is 1 μs, even reducing the feedback capacitance to 21 fF, the swing at the output of the charge integrator would be only 476 μV and would be difficult or impossible to detect over the various sources of noise (thermal, kTC and charge injection).

Hence a system which works with a single ALS and proximity sensing would not produce enough light onto the detectors of a multi-channel proximity/gesture sensing system.

One problem with the majority of the proximity sensing systems, where the amount of IR light detected is used to detect the presence of an object, is that such systems are dependent on the reflectivity of object. For example black or dark hair will reflect less light than skin. Hence a system which is adjusted so that dark hair will trigger the proximity sensor at 5 cm will also be triggered by skin at 15 cm, causing false positive.

The preferred technique to this problem is to use a technique which measures the actual distance to the object rather then returned signal level. For example, a time-of-flight technique can be used, where a LED or VCSEL (Vertical Cavity Surface Emitting Laser) is pulsed and the time for the photons to reach the detector is measured.

Multiple time of flight sensors for virtual touch or gesture detection is described in European Patent No. 2458484 (incorporated herein by reference). However, this solution requires several modules and shares the problems described earlier for multiple (intensity based) proximity sensing modules.

The time of flight technique could also be extended to the use of multiple detectors, but again the problem remains of the incoming IR light being shared amongst multiple detectors, reducing the signal, increasing the noise and reducing the reliability of this technique.

The following embodiments enable the implementation of a non-contact gesture interface while addressing the problem of low light levels over several detectors.

There is important difference between detecting the motion of an object (gesture detection) and presence of object (single channel proximity sensing). The key to reliable proximity sensing is modulating (pulsing) the light to eliminate the effect of ambient. It is proposed in the following embodiments to use the detector in integrating mode and use the ambient light to detect the target (and in particular movement of the target) rather than ignore and reject the ambient light.

It is also proposed, in some embodiments, to change the spatial frequency of the system (binning) as well as changing the speed and mode of operation.

No Binning

Figure 11A:
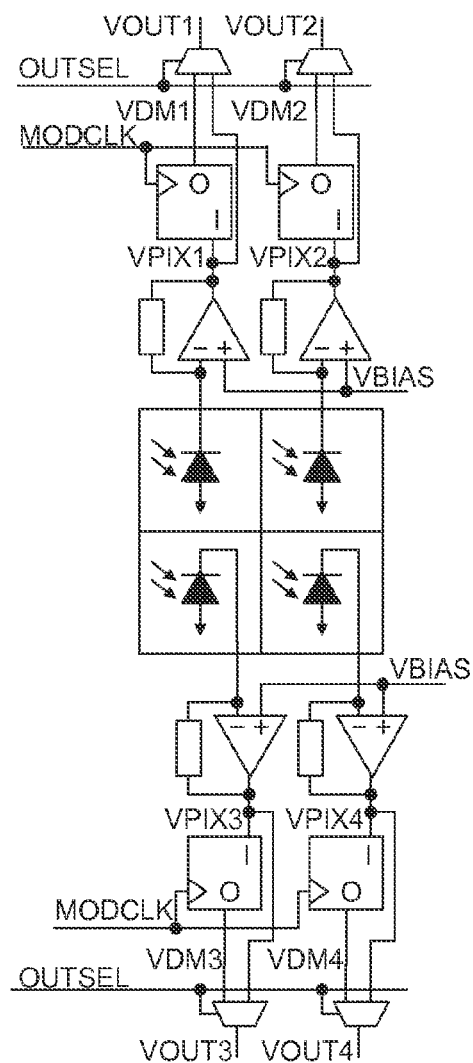
FIGS. 11a and 11b each show a non-binning combined proximity and gesture detector according to an embodiment of the invention.
Figure 11B:
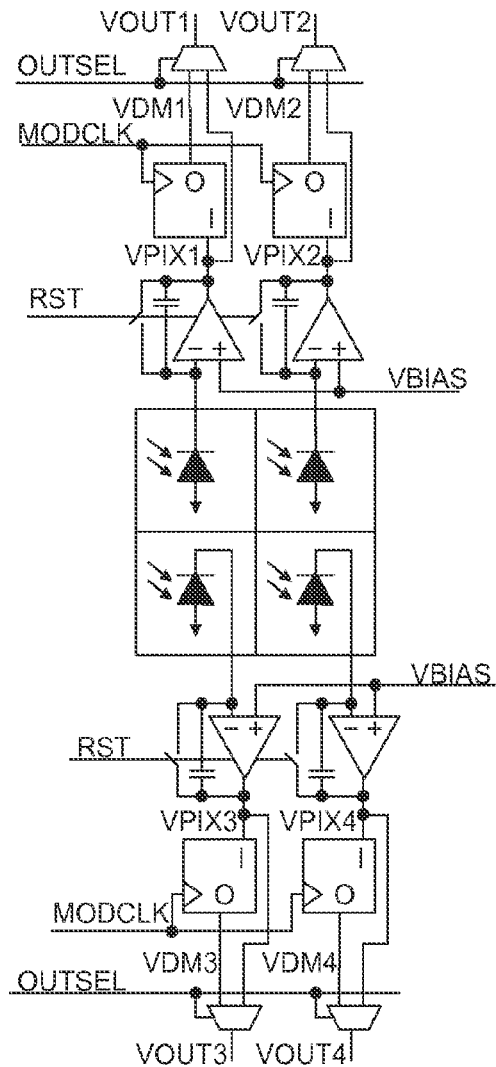

FIGS. 11a and 11b each show an embodiment which does not use binning. The circuit of FIG. 11a is essentially similar to that of FIG. 9, and circuit of FIG. 11b essentially similar to that of FIG. 10, but with the addition of the multiplexers, and having different timing signals controlling the pixels. Charge integrators are preferred over trans-impedance amplifier (although the latter devices can be used) as the capacitors store charge over a period of time and therefore, by changing the timing of operation, the magnitude of the output voltage can be changed.

As before signal VBIAS is a common reference voltage for each amplifier, and signal MODCLK is the modulating clock frequency for the lock-in amplifier (typically having the same frequency as the illumination LED (not shown)). Signal RST is a reset signal for the charge integrator. Signals VPIX1-VPIX4 are the output signals of each charge integrator, and signals VDM1-VDM4 are the output signals of each lock-in amplifier. Multiplexers pass one of either signal VPIXx (for gesture sensing) or VDMx (for proximity sensing) depending on the output select signal OUTSEL.

Figure 12:
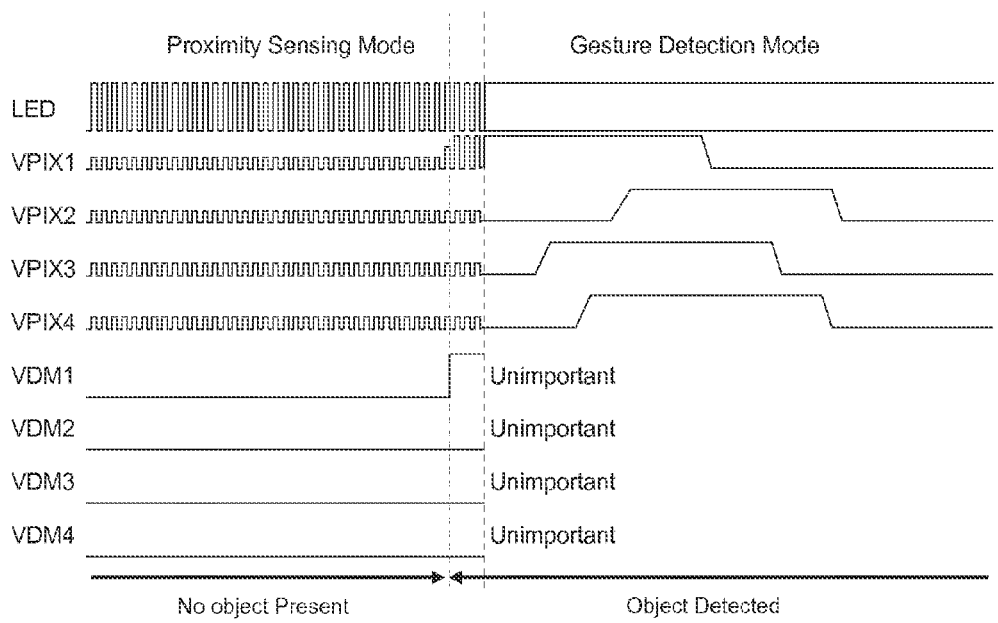

FIG. 12 shows an overview of the timing for this embodiment. Typically, the system will be in proximity sensing mode. Preferably, the LED will be modulated (for example, with a frequency of 30 kHz-300 kHz) and the lock-in detector (or other demodulation) will be used to eliminate the effect of ambient light. Initially, there is no object in the detection range of the proximity detection system and so the output of the pixels VPIXx is, in each case, that of the ambient illumination, with a very small (negligible) modulation on it. When an object moves into the field of view, it is seen here to reflect light onto a pixel, causing the modulation on VPIX1 to increase. As a consequence, the output of the demodulator lock-in amplifier VDM1 goes high. This causes the system to switch from proximity detection mode to gesture detecting mode. The signals VPIX2-4 initially remain low as there is only ambient light on the device, however as the object moves into the field of view of these photodetectors, these signals change. It is possible to detect the direction of the movement of the object by determining the sequence of the change of pixel outputs.

Figure 13:
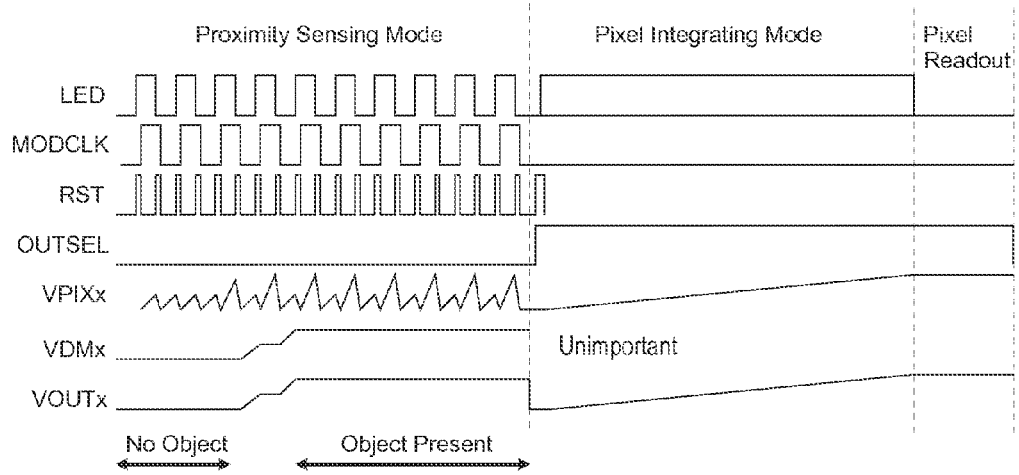
FIG. 13 is a timing diagram showing modulation and integration timing signals for the circuit of FIG. 11b.

FIG. 13 is a timing diagram showing modulation and integration timing details for this embodiment. When in proximity sensing mode, the signal OUTSEL is low, passing signal VDMx to the output VOUTx. The signal LED (driving the LED) and MODCLK are pulsed with the same frequency (although MODCLK here leads LED). Signal RST resets the charge amplifier by going high on each edge (both positive and negative) of signal LED, and low again on each edge (both positive and negative) of signal MODCLK. When no object is present, signal VPIXx is the same on both halves of the LED cycle. Consequently the lock-in amplifier output VDMx (and VOUTx) is low. When an object is present, VPIXx is higher when the LED is on, compared to when it is off. Therefore, the lock-in amplifier output VDMx (and VOUTx) is high.

In pixel integrating (gesture sensing) mode, the signal OUTSEL is high, passing signal VPIXx to the output VOUTx. LED is shown here as high, although it may equally be low if there is sufficient ambient light for sensor operation. During this integration time, signal VPIXx ramps up at a rate dependent on the incident light, with signal VOUTx following. During pixel readout, the final level of signal VPIXx/VOUTx is held as the output level for the pixel.

There are various ways of setting the integration time when the pixel is in integrating mode. It is possible to measure the level of ambient IR illumination from the lock-in amplifier and use this to determine whether there is enough ambient IR illumination to avoid turning on the IR LED.

Alternatively, the pixels can integrate for a first period of time and their output signals measured. If there is insufficient ambient IR illumination then the pixel integration time may be increased. This process (of increasing integration time and measuring signal) can be repeated until either the maximum limit for integration time is reached or the signals measured are of high enough amplitude. If the signals are still too low, then the IR LED can be turned on.

Figure 14:
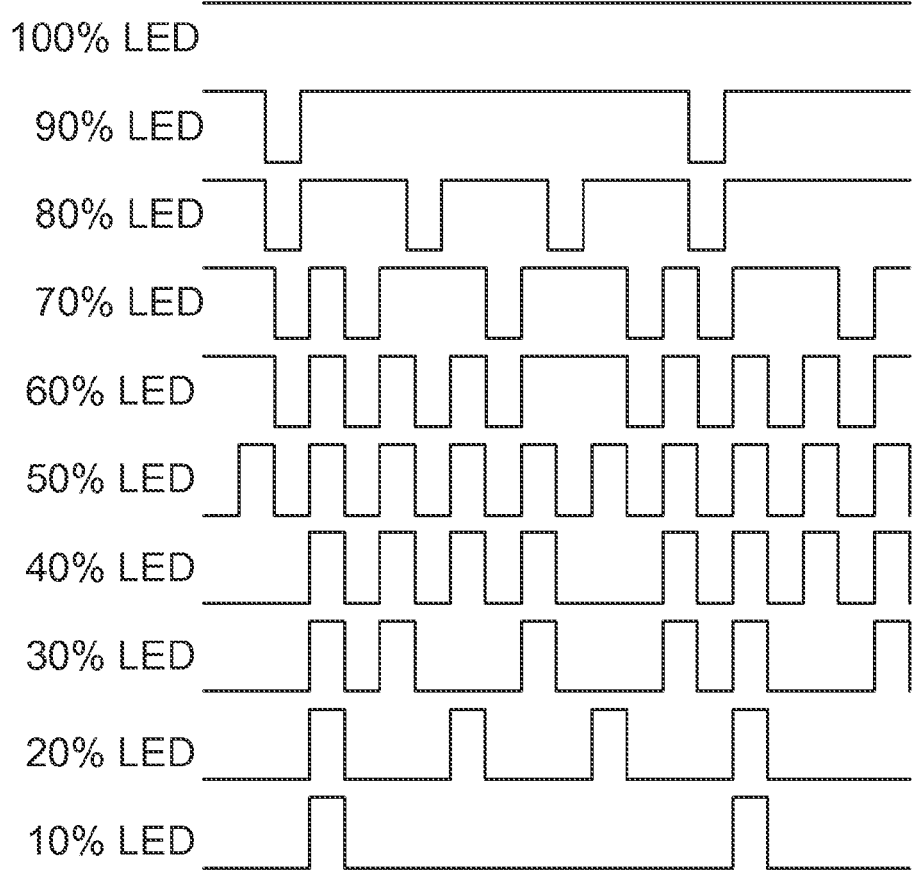
FIG. 14 is a timing diagram showing LED driver control signals for LED brightness control according to an embodiment of the invention.

To save power, it is possible to control the power levels to the IR LED. The IR LED can be continuously on, but the current into the LED varied until an acceptable signal is measured. Alternatively, the LED could be modulated with a variable duty cycle (the modulation period being the same as the integration period or an integer fraction of the integration period, e.g. two, three, four etc. illumination pulses per integration period). Alternatively, the LED could be modulated with constant width pulses, but the number of pulses per integration period varied. For example, if the proximity sensing modulation frequency was 100 kHz (10 μs), then the LED would be on for 5 μs and off for 5 μs. Hence, when the pixel is in integrating mode, the LED can still be pulsed for 5 μs on, but would remain off for a longer period, e.g. 5 μs on, 3×5 μs=15 μs off, repeated throughout the pixel integration. This would provide half the amount of light compared to where the LED is on for 5 μs and off for 5 μs throughout the pixel integration. FIG. 14 is a timing diagram showing LED driver control signals for LED brightness control, according to an embodiment.

Figure 15A:
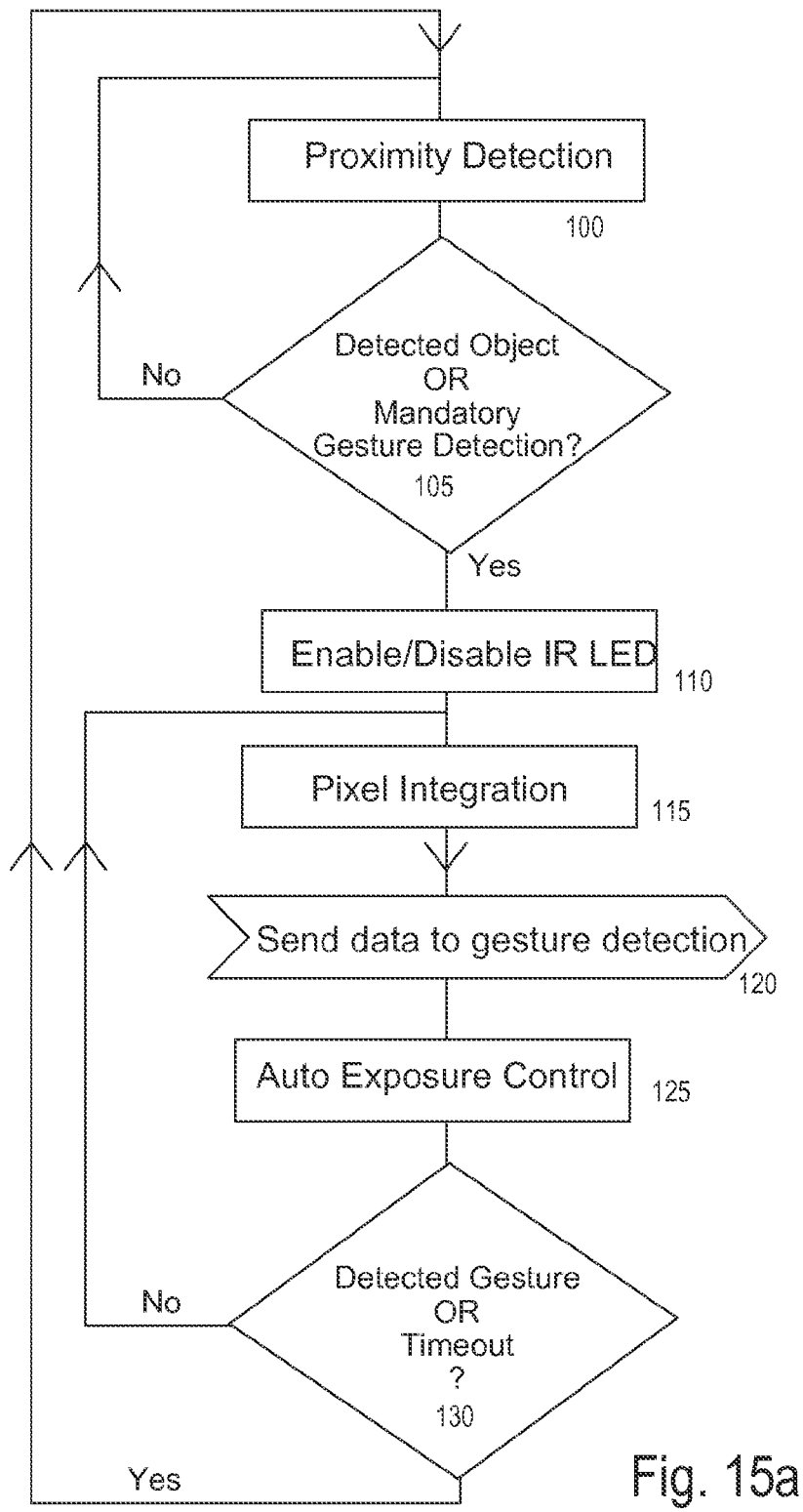
FIGS. 15a-15c are flow diagrams illustrating an operating sequence for the circuit of FIG. 11.
Figure 15B:
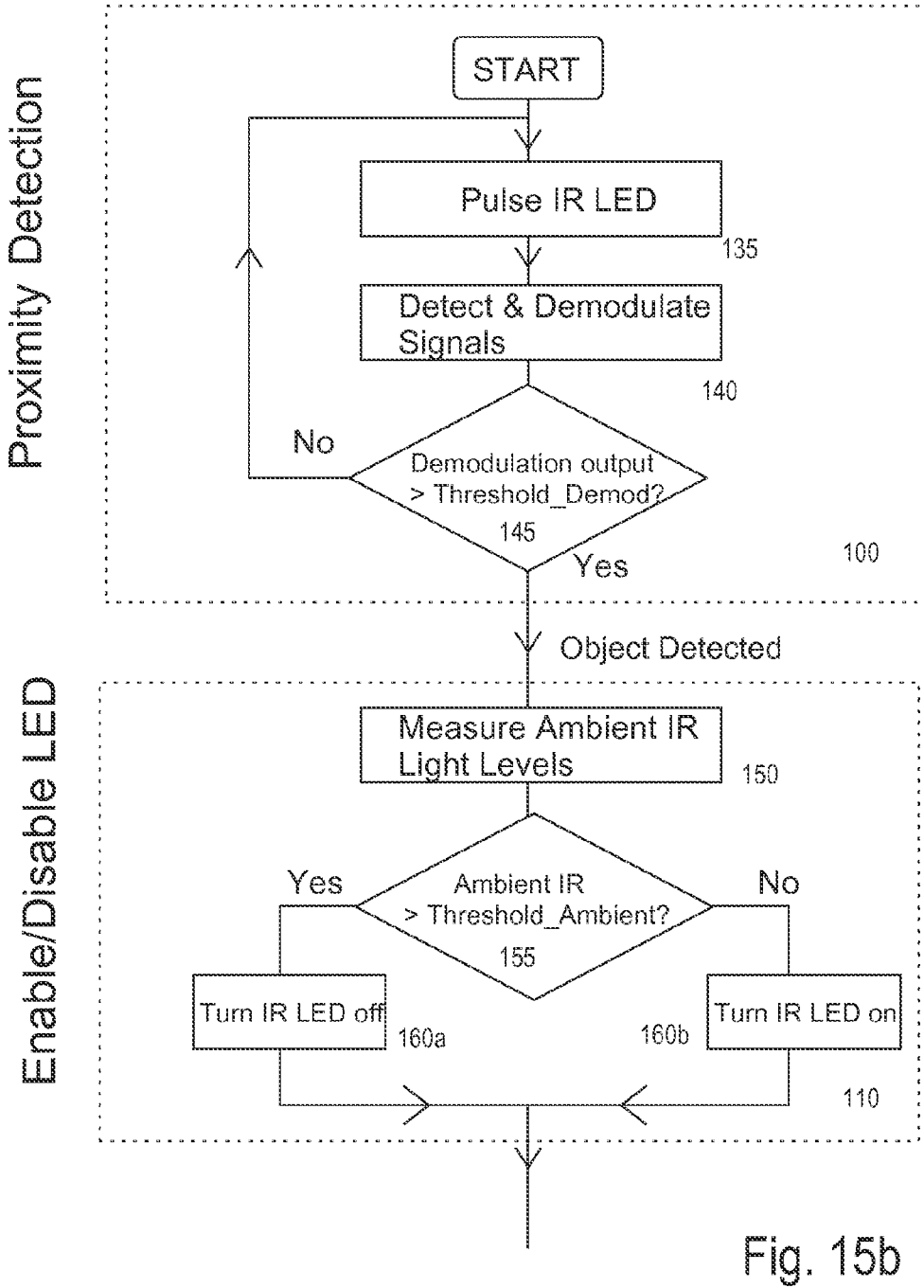
Figure 15C:
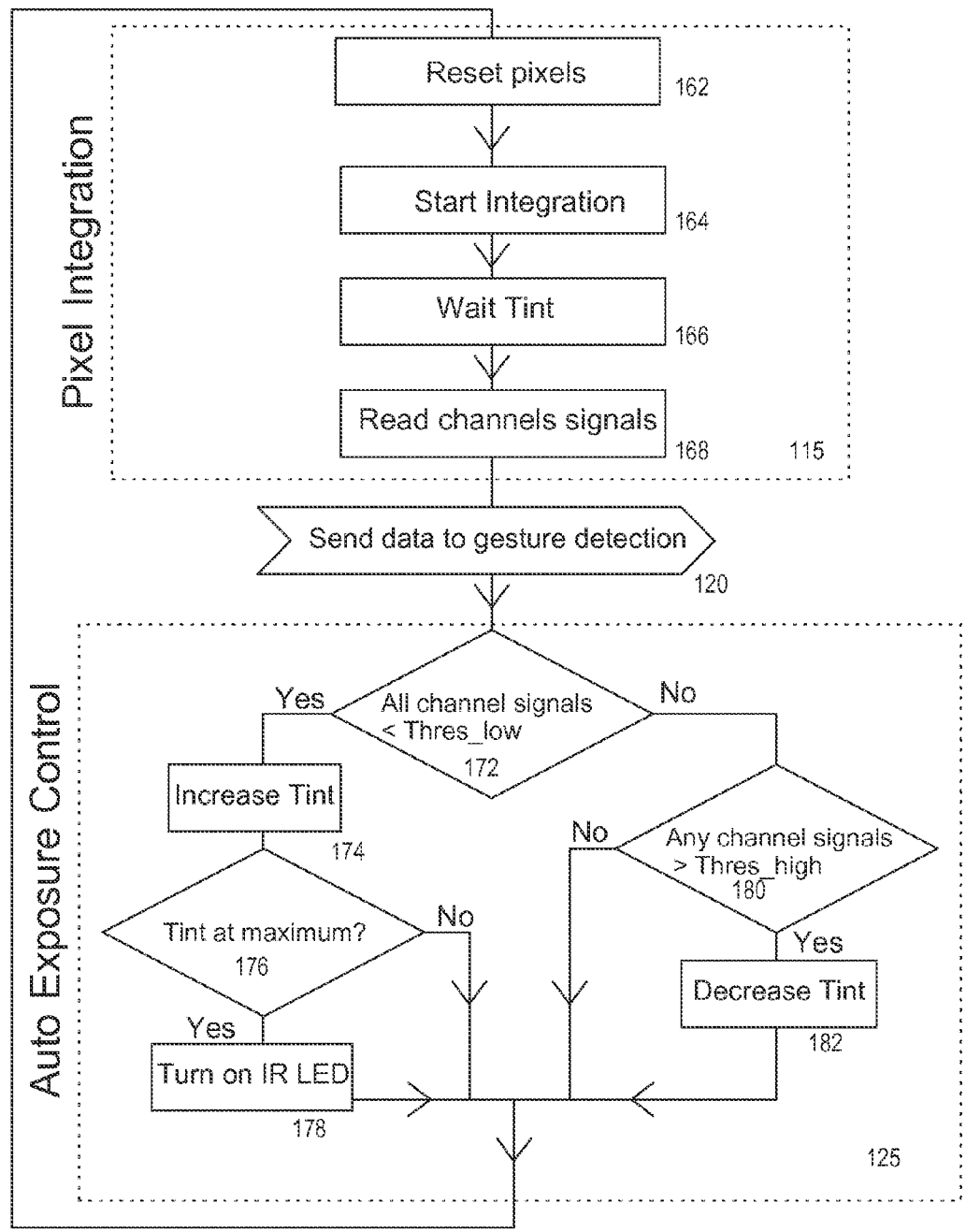

FIGS. 15a-15c are flowcharts illustrating an operating sequence of this embodiment. Starting with FIG. 15a, which provides an overview of the sequence, at step 100, proximity detection is performed. This step is expanded upon in FIG. 15b. At step 105, a determination is made as to whether an object has been detected. Optionally, this step may check to see whether it has been put in a mode requiring mandatory gesture detection. Certain applications, modes or functionality may require gesture detection as a default. If no object is detected and the device is not in a mandatory gesture detection mode, the proximity detection step 100 is repeated. Otherwise, at step 110, the LED is either enabled or disabled (depending on ambient light conditions, see FIG. 15b), and pixel integration starts (step 115, expanded upon in FIG. 15c). Following the integration period, the pixel output data is sent to a gesture detection engine (step 120), where any gesture made will be determined (if possible). Following this, there is an auto exposure control step (step 125, expanded upon in FIG. 15c). Finally it is determined (step 130) whether there has been a detected gesture (or a predetermined time has elapsed). If yes, proximity detection 100 is started again. If not, the pixel integration is performed again, the integration time having now been adjusted following the auto-exposure control step 125.

FIG. 15b is a flowchart expanding upon the proximity detection 100 and Enable/disable LED 110 steps. During the proximity detection step 100, the IR-LED is pulsed, step 135 and the signals from the photodetector detected and demodulated to remove the signal contribution resultant from the ambient light (step 140). At step 145 it is determined whether the demodulated output is greater than a threshold indicating the presence of an object. If below the threshold, the proximity detection steps are repeated. If above the threshold, it is determined that an object is detected and the Enable/Disable step 110 begins.

In one embodiment, enable/Disable step 110 begins with a measurement of ambient (IR) light levels (step 150), and a comparison of the measured ambient light levels to a threshold indicating sufficient ambient light levels for the pixel integration step. If above a threshold, the LED is turned off (step 160a). If below a threshold, the LED is turned on (step 160b). The turned on LED may, in fact, be driven by a pulsed signal as described above in relation to FIG. 14. Other embodiments of the enable/disable step 110 may comprise turning the LED on as a default, reading the signal on the pixels and, if too bright, turn the LED off; or alternatively turn e LED off as a default and, if there is insufficient light, turn the LED on.

FIG. 15c is a flowchart expanding upon the pixel integration 115 and auto exposure control 125 steps. During the pixel integration step 115, the pixels are reset 162, and integration begins 164. A predetermined integration time (Tint) is allowed to elapse 166, after which the channel signals are read 168. These signals are then sent to be processed by the gesture detection engine 120.

The auto exposure control begins by determining whether all the signals from each of the channels are below a bottom threshold (step 172). If yes, the integration time is increased 174. At step 176, it is determined with the integration time is at a maximum (e.g. at a level after which the pixel will saturate). If it is, the LED is turned on (step 178). If, at step 172, all the signals from each of the channels are not below the bottom threshold, it is then determined (at step 180) whether any of the channels are above a top threshold 180. If yes, the integration time is decreased, step 182. The pixel integration step 115 is then repeated.

Changing Spatial Resolution

As spatial resolution is not required for proximity sensing, it is possible to combine the signals from all the separate photodetectors on the device. As the sensing area is now similar to that of a single photodetector, the sensitivity of the device is also the same as when there is a single photodetector for proximity.

It is not necessary to bin (combine) all the photo-detectors. For example it may be desired for the gesture detector to have a wide field of view (e.g. to detect broad sweeps of movement) and for the proximity sensing to have a narrow field of view (e.g. to avoid false detections). Hence, in one embodiment, only photodetectors in the central portion of the array are combined when operating in proximity detection mode, and when operating in 2D mode for gesture detection all the photodetectors are used.

Typically, once an object has been detected the system will go into integrating mode. The signals from the photodetectors will be switched to be independent and photo signal (current, charge or voltage) collected for a period of time "pixel integrating mode". The integration time may be fixed (e.g. 50 ms which avoids flicker from both 50 Hz and 60 Hz mains illumination system) or varied according to the ambient light level. (possibly using the on-chip ALS to determine the integration time). At the end of the integration time, the signals from the separate pixels can be read out.

Note that in pixel integrating mode, the lock-in amplifier is typically not used, and therefore ambient light is not rejected. Instead, the ambient light is used to detect the position of the object relative to the sensor. If the ambient light level is low (e.g. below 10 Lux) and there is not enough ambient illumination to detect a signal of sufficient quality or reliability (insufficiently high signal-noise ratio), then the proximity sensing LED may be turned on to illuminate the scene. If the ambient light level is high, (e.g. >1000 Lux), then the LED would be turned off to save energy and ambient light alone used to illuminate the object.

This pixel integrating/pixel readout mode can be repeated and the direction of movement of the object determined. If necessary, the system could switch briefly (e.g. LED modulation cycles) into proximity sensing mode to ensure that an object was still in the field of view of the system.

There are various means of implementing this concept, each with different advantages and disadvantages.

Rolling Blade System

Rolling blade systems are the most common type of imaging systems. Such systems make it practical to make arrays with large number of pixels, each of the pixels being small. With rolling blade systems, the pixels in a column share a common readout (amplifier or ADC). At any one time, a single row of pixels is enabled for read and the output signal (usually voltage, but could be charge or current) is then read out. This is repeated row by row until the whole array is read out. Similarly one row at a time is reset, this being repeated throughout the array. With this technique, each pixel has the same integration time, but the array is not integrating at the same time, this being similar to the mechanical blades in a silver-halide film camera which move to open and close and expose the film.

For the following rolling blade embodiments, the standard rolling blade pixels are modified so that the photo-charge can be shared during the proximity detection mode, but so that the pixels can also operate separately in the gesture detection mode.

Figure 16A:
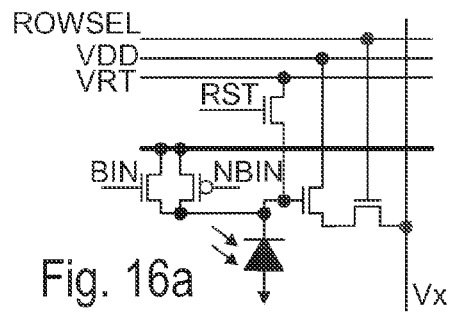
FIGS. 16a and 16b show two pixel schematics suitable for a rolling blade shutter embodiment of the invention.
Figure 16B:
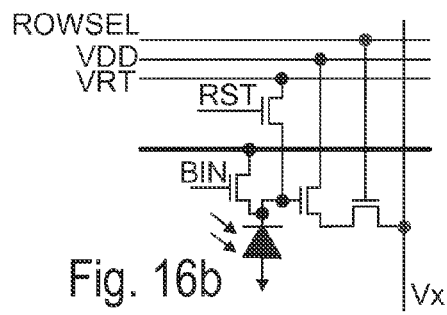

FIGS. 16a and 16b show two pixel schematics suitable for this embodiment. They are modified versions of standard 3T pixels. The modification adds switching transistor(s) to the photodiode node so that the charge from all the pixels can be combined if necessary. In FIG. 16a, the new transistors are those with inputs BIN and NBIN, while in FIG. 16b the new transistor is that with input BIN. FIG. 16a is a CMOS version, which has the advantage that it will operate over a wider voltage swing on the photodiode (wider dynamic range). However, U.S. Pat. Nos. 6,969,879 and 6,998,659 (both incorporated by reference) teach that it is possible to increase the responsiveness of these pixels by using small implants of N-Well surrounded by P-type epitaxial (very lightly doped), but only if the entire pixel is made from NMOS circuitry. For this reason the modified 3T pixel with only NMOS transistors, as shown in FIG. 16b, is preferred.

In FIGS. 16a and 16b, the signals are as follows:

The signal ROWSEL is used to enable the output transistor of the pixel and the photodiode voltage (buffered by the source follower transistor) is output on the bitline Vx (which is common to all the pixels in the column)

The signal VDD is the supply voltage to the source follower transistor

The signal RST is used to reset the photodiode in the pixel. When this goes high (positive voltage if NMOS switch is used) then the voltage on the photodiode is reset to the level of signal VRT The signal BIN is the new control signal. If it goes to a high voltage (preferably the highest voltage provided for in the process, typically 1.8V or 3.3V), then the NMOS transistor is enabled and the charge collected by each photodiode is available on the common line (drawn thick in horizontal). When the pixel is operating individually (i.e. gesture detection mode), then BIN is low (ground or 0V)

In FIG. 16a with CMOS signal, the complementary polarity voltage is applied to NBIN, which is connected to the gate of the PMOS transistor (GND to enable this transistor, positive supply to disable).

Figure 17:
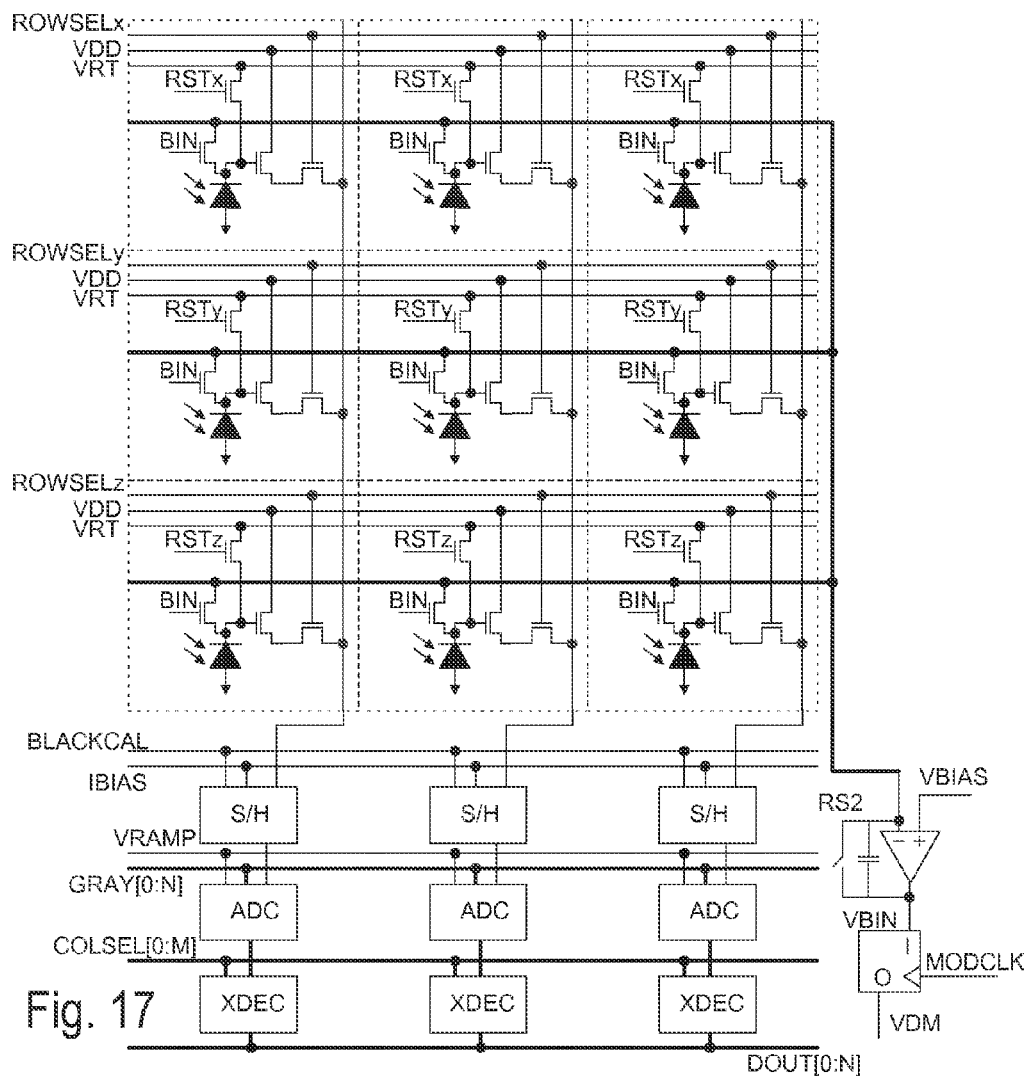
FIG. 17 shows a circuit for a rolling blade shutter combined proximity and gesture detector according to an embodiment of the invention.

FIG. 17 shows the pixels of FIG. 16b (although, of course, the pixels of FIG. 16a may be used) combined into an array which provides this unique feature of being able to output either a 2D image (gesture mode) or a large signal from combining the individual pixels (proximity detection mode).

The function of the signals ROWSEL, VDD, VRT, RST and BIN have been described previously (note that in the array there are separate ROWSEL and RST signals for each row to implement the rolling blade shutter functionality). The other signals are as follows:

The signal BLACKCAL is used to control the reset signal and also the exposed signal in the sample and hold circuit S/H. This allows for double sampling of the signal to remove the pixel to pixel variations in each pixel's source-follower transistor, which would otherwise give different offsets for each pixel. This technique is well known and employed by virtually all sensors with 3T pixels.

The signal IBIAS is a reference signal (although there may be more). Each pixel's source follower required a load to operate and this is typically incorporated into the sample/hold block (S/H).

This readout uses the commonly employed "single-slope column parallel" analog to digital converter (ADC) technique (although many others are available and could be used here, e.g. analog readout, sigma-delta ADC, flash ADC or successive approximation ADC). With single-slope ADC, a single ramp generator (usually a digital to analog converter—DAC—not shown), is used to provide a time varying reference voltage "VRAMP". Simultaneously to the signal VRAMP increasing, a digital bus increments (preferably using gray code to avoid race conditions between the different bits on the bus). When the VRAMP voltage equals the output from the sample/hold circuit, the comparator in the ADC fires and the data on the GRAY[0:N] bus is stored. Hence this stored digital value represents the analog voltage on the pixel.

To read out the digital value from each pixel, the column select signal COLSEL[0:M] is used to enable one of the X-axis decoder circuits XDEC (they are similar blocks, but each has a unique decode address) which enables the output of the appropriate ADC. Each X-axis decoder decodes the column select bus so that only one column's output is enabled. By incrementing the column select bus, the image is scanned in the X-axis.

FIG. 17 shows a proximity detection circuit comprising a charge integrator. Where the LED modulation frequency is low, for example less than 50 kHz, it is practical to employ a switching type of detector such as the charge integrator shown here. Where the LED modulation frequency is higher, it becomes less practical to employ a switching system as there is a "dead time" between switching phases. This causes some of the photo-generated signal to be lost thereby reducing the system's responsiveness. Consequently, when high modulation frequencies are used a trans-impedance amplifier (operational amplifier with resistor feedback), such as that shown in FIG. 5a, may be employed instead of charge integrator.

The charge integrator is suitable for lower levels of signals as the feedback capacitor can be made small to provide higher gain (for example a 21 fF capacitor occupies typically 5 µm×5 µm of space). This is more practical on an integrated circuit than a trans-impedance amplifier which requires a higher resistance for higher gain, and therefore occupies a greater area (e.g. a 1 MΩ resistor takes up an area of 100 µm×100 µm).

It can therefore be seen that it is possible to have many small pixels (e.g. 5 µm×5 µm up to 50 µm×50 µm) and use the small value (5 fF to 50 fF) of the photodiode intrinsic capacitance to provide a high conversion gain when the system is in the gesture detection (2D mode); and then to switch to a binning mode for proximity detection, combine the pixel signals and use a relatively low value feedback resistor (e.g. 10 kΩ to 100 kΩ) in a trans-impedance amplifier, should a higher LED modulation frequency is used.

Global Shutter System

An alternative to rolling blade systems described above are global shutter systems. With global shutter, every pixel in the array is simultaneously exposed to light (common reset and readout). It is common for all the pixels in the column to share a readout (amplifier or ADC). Therefore each pixel should have light-shielded storage such that, at the end of the integration time, the pixel signal is stored in the in-pixel memory before being read out. This in-pixel storage typically adds to the size of the pixel. An alternate technique to implement global shutter pixels is described U.S. Pat. No. 7,375,752 (incorporated herein by reference) where there is still (at least) one storage element for each pixel, but this storage element is located outside the image plane, thereby saving space inside the pixel and allowing for more light to be received by each pixel. This technique adds extra wiring between the photo-array and readout electronics and so is best suited to small format sensors, e.g. up to 20×20 pixels.

For gesture detection, a global shutter system is preferred as all the pixels are exposed simultaneously and so any motion of the object is the same on all pixels.

There are various types of global shutter pixels (see for example, Great Britain Patent No. 2487943, incorporated by reference) which employ in-pixel storage, but gesture detection requires a low resolution array, for example up to 20×20 pixels. Therefore storage external to the array (U.S. Pat. No. 737,572 incorporated by reference) is preferred as this simplifies the circuitry of the pixel (more light on the pixel) at the expense of more complex wiring.

Figure 18A:
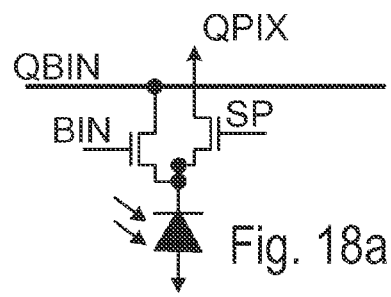
FIGS. 18a and 18b show two pixel schematics suitable for a global shutter embodiment of the invention.
Figure 18B:
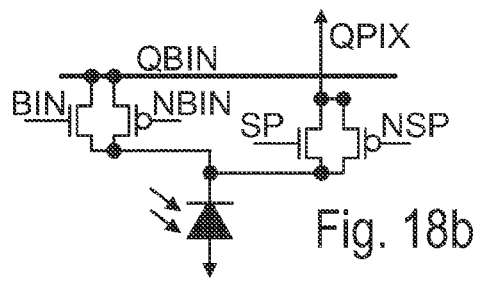

FIGS. 18a (NMOS) and 18b (CMOS) show two pixel schematics suitable for this embodiment. As described previously, NMOS pixels are preferred. The pixels differ from those known by having two outputs, with one commoned (binned) and one connected to its own readout.

When the pixel is operating in the proximity detection mode and all the photo-generated charges are to be binned, then the signal BIN goes high (and NBIN low if PMOS transistors are used) and signal SP (single pixel) goes low (and NSP goes high). Conversely, when the system is operating in gesture detection mode and spatial resolution of the system is required with each pixel outputting independent signals, then signal SP goes high and signal BIN goes low.

Figure 19:
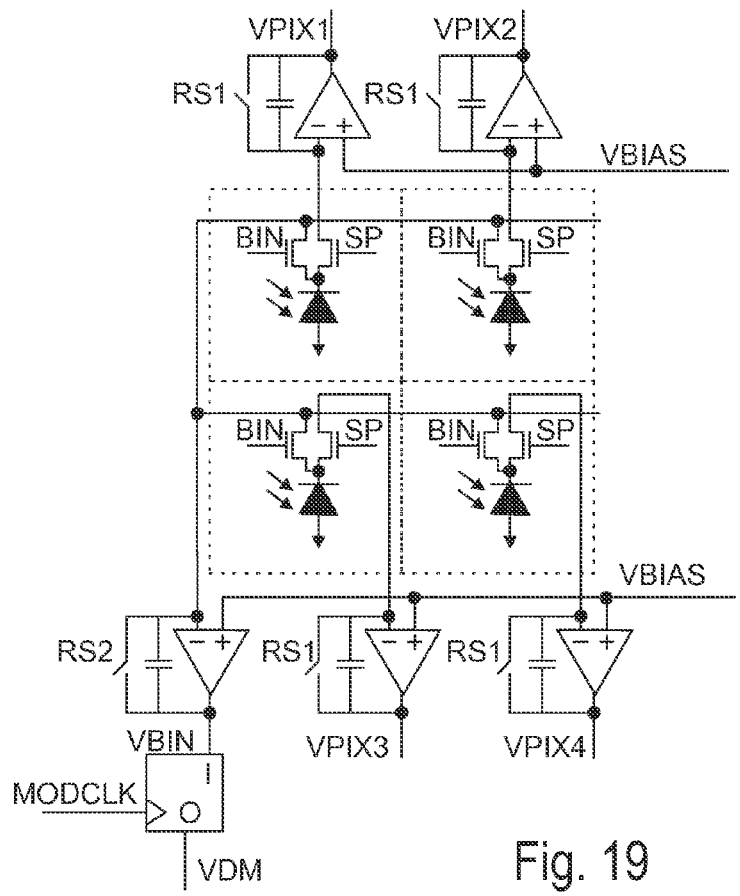
FIG. 19 shows a circuit for a global shutter combined proximity and gesture detector according to an embodiment of the invention.

FIG. 19 shows an embodiment employing the global shutter pixels of FIG. 18a. Each pixel has its readout and storage outside the array, shown here being provided for by a charge integrator circuit (operational amplifier and capacitor feedback). Preferably, the feedback capacitor on each of the individual charge integrators (outputs VPIX1-4) are the same and the reset switches (RS1) are all operated simultaneously.

The feedback capacitor of the charge integrator used for the proximity sensing (that is the charge integrator with output VBIN and reset switch RS2) may have a different value to that of the other the charge integrators. Even taking into consideration that the pixel outputs are combined in the proximity sensing mode, as the LED modulation frequency (proximity sensing mode) is much higher (e.g. 100 kHz) than the integration time in gesture detection mode (e.g. 10 ms—that is 1000× faster), there is still less charge available for the proximity sensing charge integrator. Therefore its feedback capacitance can be smaller than that of each of the individual pixel's charge integrator.

For example, as the FIG. 19 example has four pixels, should the integration time be 1000 times greater than the LED modulation period, then there would only be 4/1000 of the charge available for the proximity sensing charge integrator compared to that available to the other charge integrators during following an integration period. Therefore its feedback capacitance may be chosen to be 4/1000 that of each individual pixel's charge integrator.

Also, the reset control signal for the proximity sensing charge integrator's reset switch RS2 may be different to the reset control signal for the individual pixels' charge integrators RS1.

As described in relation to the rolling blade shutter embodiment, where there is a higher frequency LED modulation, it is preferable to use a trans-impedance amplifier for the proximity detection circuit. Consequently, the circuit of FIG. 19 could be modified by replacing the proximity sensing charge integrator with a trans-impedance amplifier. Charge integrators would still be used for gesture detection mode.

Typically the VBIAS signal for all of the charge integrators are the same. FIG. 19 shows the use of a differential operational amplifier for the charge integrators, however it is possible to use a single-ended amplifier (e.g. inverter) which does not employ the use of the VBIAS line.

FIG. 19 shows the use of charge integrators for each pixel (whose outputs are VPIX1-VPIX4) to convert the photo-generated charge into a voltage, however other readout methods are possible:

In a similar manner to the 3T pixel, it is possible to use the photodiode's capacitance to convert the charge to a voltage and to then convert the voltage to a numerical value outside of the photo array. The conversion may be performed by, for example, either an analogue buffer or an ADC (e.g. single-slope ADC, flash ADC, successive approximation ADC, sigma-delta ADC or other).

Figure 20:
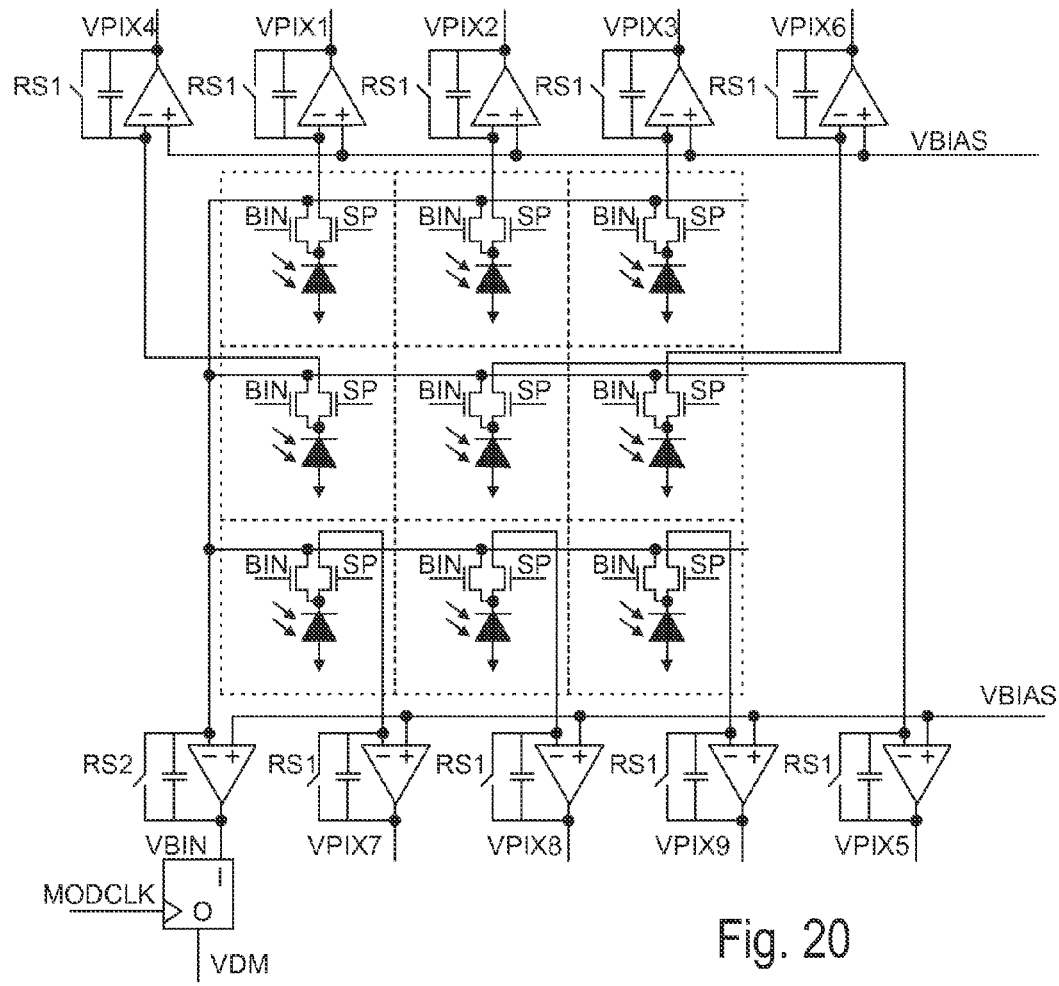
FIG. 20 shows a variation on the circuit of FIG. 19, comprising a 3×3 pixel array.

Use a trans-impedance amplifier (e.g. amplifier with a resistive feedback) to convert the photo-generated current into a voltage—however a large feedback resistor is often required and therefore is undesirable due to the space in every column this occupies The circuit shown FIG. 19 uses 2×2 array of sensors. The spatial resolution (number of pixels) can be increased. FIG. 20 shows an example with a 3×3 array of sensors. As before, this circuit could be modified by replacing the proximity sensing charge integrator with a trans-impedance amplifier.

Global Shutter Sensor with Per Pixel ADC

FIG. 19 shows the photo-generated charge being converted into a voltage outside of the array. Not shown in these figures is the conversion of a voltage to a digital value, which is also performed outside of the array.

U.S. Pat. No. 6,969,879 (incorporated herein by reference) discloses a technique where the photo-generated charge is converted to a voltage inside the pixel (using the photodiode's intrinsic capacitance) and this voltage is compared to a reference (RAMP) voltage inside the pixel, forming part of a comparator and single-slope ADC. The rest of the circuitry (the PMOS part) is implemented outside the array. Such pixels can be modified for use with the concepts described herein.

Figures 21A, 21B:
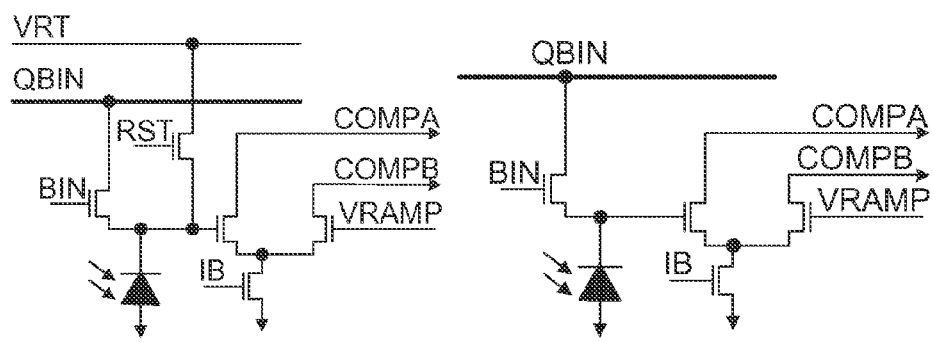
FIGS. 21a and 21b show two pixel schematics suitable for embodiments of the invention having in-pixel digital conversion.
Figure 25:
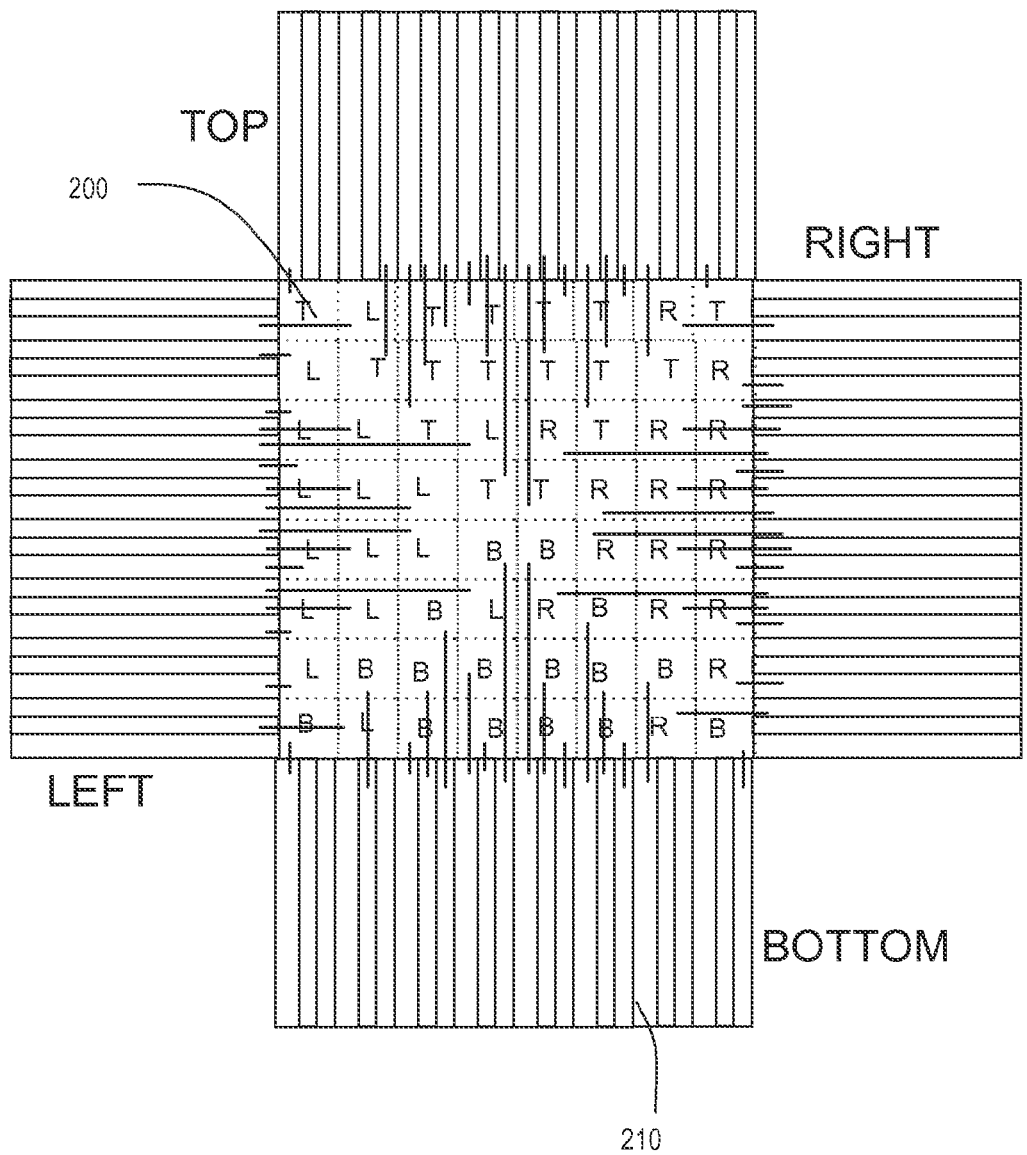
FIG. 25 shows a third readout amplifier layout according to an embodiment of the invention.

FIGS. 21a and 21b show circuit diagrams of such a modified pixel in different embodiments. In FIG. 21a:

Signal IB is set to a suitable reference bias so that the transistor operates as a current load. 1 µA is typical Signal VRAMP is on the non-inverting input of the comparator (formed from the NMOS transistors in the pixels, excluding the BIN/QBIN transistor, and the PMOS transistors outside the photo-array). Typically it is connected to a ramp generator circuit, e.g. DAC.

Signal RST is used to reset the pixels, mainly in integration/2D/gesture detect mode (similar operation to 3T pixel described earlier).

Signal VRT is the voltage to which the photodiode is reset in integration/2D/gesture detect mode.

Signals COMPA and COMPB are the outputs of this pixel. These three transistors form a differential input, "long-tail" pair.

As the photo-generated charge is converted into a voltage by the intrinsic capacitance of the photodiode, pixel-pixel variations in the photodiode's capacitance will produce a variation of responsiveness over the sensor. If it is required that this is minimized, then U.S. Pat. No. 7,288,801 (incorporated herein by reference) teaches a suitable technique to do this.

The circuit of FIG. 21b is very similar to that of FIG. 21a except that the reset transistor and reset reference voltage are no longer present. One unique feature of many of the embodiments described herein is the commoning of all the photo-diodes for proximity detection (the BIN control line and QBIN signal line). The QBIN line is common to all pixels and also an amplifier (either trans-impedance or Charge integrator) outside the array. As part of its readout operation, this amplifier (trans-impedance or charge integrator) will force the QBIN line to a particular voltage as it converts the photo-generated charge from all the pixels into a voltage. This action is similar to resetting the pixel and so it is not necessary to include a separate reset switch and reference line in the pixel.

FIG. 22 shows a typical circuit to which each pixel may be connected. This circuit is preferably outside the array as it incorporates PMOS transistors. PMOS transistors are fabricated inside an NWell and this NWell is biased at Vdd (the most positive supply voltage). Therefore, if this circuit was inside the array, some of the negatively charged photo-generated electrons would be attracted to this NWell rather than the photodiode, and some of the signal would be lost.

This circuit turns the differential current on the COMPA/COMPB pair into a voltage Comp_Out. The high gain of this circuit (combined with the pixel) implies that the Comp_Out signal is digital: that is it is low (near the ground potential) or high (near the Vdd potential). Therefore it is suitable to enable/disable the storage of values into a memory circuit, thereby converting the light level on the photodiode into a digital code.

Layout Details

As previously mentioned, the pixel arrays may be of any size, but as the number of pixels increases, the wiring between the pixels and the external readout circuitry becomes more complex. It is more practical if the readout amplifiers outside the array are narrower than the pixels. For example, if the pixels are 30 μm×30 μm, then in a 3×3 array 200, the readout amplifiers 210 would be 10 μm wide. Therefore all three amplifiers for each column would fit entirely inside the column. This is illustrated in FIG. 23. The circuitry for the proximity detection could be placed wherever it is convenient. FIG. 23 shows it at the side of the array.

This technique can be extended for a greater number of pixels, but it becomes inconvenient to either enlarge the pixel or layout a very narrow circuit. For more pixels, the readout electronics can be conveniently located on both sides of the array, with the pixels in the top half of the array connected to the readout circuitry on the top part of the array and pixels in the bottom half of the array connected to the readout circuitry on the bottom part. This is illustrated in FIG. 24.

It is also possible to put the readout circuitry on all four sides of (a square) imaging array, as shown in FIG. 24. Here, although the pixel is only 3 times the width of the readout, an 8×8 array of pixels can be implemented.

Image Signal Processing

Once a 2D image from the integrating pixels has been produced, the gesture detection can be performed using an algorithm on custom digital logic or a controller.

Finding the direction of an object moving across an image sensor can be done in a variety of ways. In one embodiment, the images are processed into the respective light levels measured for particular sections of the image or field of view of the camera (for example, North, South, East, West, or additionally NE, NW etc). The direction of travel can then be attributed to measured drops in the light level on particular sections. This can be considered both in isolation and/or with reference to previous measured light levels. Each section may comprise one pixel of the array (therefore a 3×3 pixel array will have nine sections), or may comprise more than one pixel.

When an object is first detected on the sensor, the section on which the drop is detected can be used to deduce the initial direction of the object. In this example, should only one section have a lower level, the levels of the other sections being the same, this would indicate that the direction the object is travelling in the direction opposite to the section measured, e.g. if only the west section has lower light levels (and no drops in light levels had been measured immediately prior) it can be deduced that the object is travelling in an easterly direction.

If a drop in light level has been measured immediately prior, then this can be used in combination with presently measured drops in light levels to deduce the object's direction of travel. For example if low light levels had been measured in the east section immediately prior, and subsequently measured in the west section, this would indicate that the object is travelling in a westerly direction. Whole sequences of changes can be used in a similar manner to determine gesture sequences. By way of example, three subsequent measurements showing firstly a drop in the north-west section, followed by a drop in the west section, followed finally by a drop in the east section, may indicate an "L-shaped" gesture, the object moving south then east.

It should be appreciated that, in low ambient light conditions where the LED is used, increases in light levels in a particular section may be observed as indicating the presence of the object in the field of view of that section. This is because, instead of the object blocking ambient light incident on the sensor, it will reflect light emitted from the LED back towards the sensor. Knowledge of whether the LED is on or off may be used to decide whether an increase or decrease in light levels should be attributed to a presence of an object.

There are other known methods for determining the motion of objects in an image, such as those described in United States Patent Application Nos. 2006/0159177 (Mellot) or 2007/0019733 (Mellot) or S2007/0040805 (Mellot) or 2008/0316174 (Mellot), all of which are incorporated by reference. In United States Patent Application No. 2006/0159177 a motion estimation method is described for processing successive images in an image sequence, with a motion vector being associated with each of the processed images. For a current image, motion vectors associated with images that precede the current image in the sequence are selected. Candidate motion vectors are generated from the motion vectors that are selected. A motion vector is elected from among the candidate motion vectors. Information that associates the elected motion vector with the current image is stored in memory. At least one of candidate motion vectors is an acceleration vector generated from the acceleration between first and second motion vectors averaged relative to a first and second images, with the first and second images being distinct and preceding the current image in the image sequence. A motion vector averaged relative to a given image is obtained from selected motion vectors associated with images preceding the given image In United States Patent Application No. 2007/0019733, to associate a motion vector with an image of the sequence currently being processed, k candidate vectors are generated by adding, to a reference motion vector, respectively k search vectors. Then, a motion vector is selected from among the k candidate vectors as a function of a selection rule. Thereafter, the previous two steps are repeated m times, the reference motion vector being on the one hand, for a first iteration of the first step, an initial reference vector selected from among a set of vectors comprising at least one motion vector associated with a previous processed image and being on the other hand, for the m repetitions of the first step, the motion vector selected in the second step preceding the first step. Then, the vector obtained in the third step is associated with the image currently being processed United States Patent Application No. 2007/0040805 discloses a method in which, in a first step, a temporary motion vector is determined as a function of reference data comprising a preceding image and a motion vector associated to the preceding image. Then, in a second step, if the temporary motion vector does not satisfy a reliability criterion, the first step is repeated in relation to a following image, on the basis of the same reference data. Otherwise, the temporary motion vector is associated with the current image.

United States Patent Application No. 2008/0316174 discloses a process for determining the displacement of an entity equipped with a sensor for capturing a sequence of images, comprising a step for determining a motion vector associated with a current image as a function of at least one correlation calculation between a first block of pixels in the current image and a second block of pixels from which the vector points towards said first block of pixels, with said second block being in a previous image in the sequence of images, wherein the dimensions of the first block are determined as a function of at least a motion vector associated with a previous image in the image sequence.

Various improvements and modifications may be made to the above without departing from the spirit and scope of the invention. Different array configurations are possible. Also aspects from one embodiment will, where appropriate, be applicable to other embodiments.

What is claimed is:

1. A proximity and gesture detection module, comprising:
   an illumination source;
   a plurality of radiation sensors; and
   a controller;
   said module being operable in a proximity detection mode and a gesture detection mode;
   wherein, when said module is in said proximity detection mode:
      said illumination source is operable to emit radiation,
      said module is operable to measure the level of radiation incident on one or more of said radiation sensors, said level of radiation being attributable to ambient radiation and, when there is an object present in the field of view of said one or more of said radiation sensors, radiation from said illumination source which has been reflected by said object towards said one or more of said radiation sensors; and
      said controller is operable to determine the presence of an object in the proximity of the module by adjusting said measured radiation level to substantially cancel the contribution attributable to the ambient radiation, and comparing said adjusted radiation level to a proximity threshold; and
   wherein, when said module is in said gesture recognition mode:
      said module is operable to repeatedly sample the level of radiation incident on each of a plurality of said sensors, individually;
      said controller is operable to determine the movement of an object in the field of view of said sensors by comparing the changes in the measured radiation levels over a plurality of said samples; and
      wherein any ambient radiation contribution is not removed from the sampled radiation levels during said gesture recognition mode.

2. The module as claimed in claim 1 operable, in said gesture recognition mode, to detect a gesture made by an object without making contact to a surface or other object.

3. The module as claimed in claim 1 wherein, in said proximity detection mode, the illumination source is operable to emit pulsed radiation; and the one or more radiation sensors are operable to detect the level of radiation incident thereon both when the illumination source is on and when the illumination source is off and wherein the module further comprises modulation means operable to use the measured radiation level when the illumination source is on and the measured radiation level when the illumination source is off to cancel the contribution of the measured radiation level attributable to the ambient radiation; and wherein said modulation means is operable not to be used in said gesture recognition mode.

4. The module as claimed in claim 1, comprising an ambient radiation sensor operable to determine ambient radiation level.

5. The module as claimed in claim 4 operable in said gesture recognition mode, to: determine said ambient radiation level, compare said ambient radiation level to an ambient threshold, and activate said illumination source if said ambient radiation level is below said ambient threshold.

6. The module as claimed in claim 1 wherein, when in said gesture recognition mode, each of said plurality of sensors is operable to integrate the incident radiation thereon during an integration time.

7. The module as claimed in claim 6 wherein the controller is operable to repeat said the integration of the incident radiation with an increased integration time if it determined that the sampled radiation levels of all the sensors are all below a first integration threshold and/or wherein the controller is operable to repeat the integration of the incident radiation with a reduced integration time if it determined that the sampled radiation levels of at least one of the sensors is above a second integration threshold.

8. The module as claimed in claim 1 wherein, when in said gesture recognition mode, said controller is operable to obtain a two dimensional image from the sampled radiation level for each sample, and to determine the motion of the object in two-dimensions from changes in this image between samples.

9. The module as claimed in claim 1 operable, in said proximity detection mode, such that the outputs of said plurality of radiation sensors, or a subset thereof, are combined into a single output.

10. The module as claimed in claim 9 wherein each sensor comprises at least one switching device for selectively connecting each of said outputs to a common node.

11. The module as claimed in claim 10 wherein said at least one switching device forms a first output which is combined with outputs of other sensors to form said single output, and each sensor further comprises a second output for individual sampling of the sensor outputs in said gesture recognition mode.

12. The module as claimed in claim 9 comprising a dedicated amplifier for reading out said combined outputs at said common node.

13. The module as claimed in claim 12 wherein said dedicated amplifier is a trans-impedance amplifier.

14. The module as claimed in claim 12 wherein said dedicated amplifier is a charge integrator.

15. The module as claimed in claim 1 wherein said sensors are arranged in a two dimensional array.

16. The module as claimed in claim 15 wherein, in said gesture sensing mode, said module is operable such that every sensor is exposed simultaneously during each of said samples.

17. The module as claimed in claim 16 wherein each sensor comprises a charge integrator for obtaining an output voltage for the sensor.

18. The module as claimed in claim 17 wherein each of said sensors comprise a comparator operable to compare said output voltage to a time varying reference signal inside of the sensor.

19. The module as claimed in claim 16 wherein the module is operable to use the capacitance of said sensor's photodiode to obtaining an output voltage for the sensor.

20. The module as claimed in claim 15 wherein, in said gesture sensing mode, said controller is module is operable such that said sensors are exposed a row at a time during each of said samples.

21. The module as claimed in claim 15 wherein said module comprises a plurality of readout amplifiers, the width of said readout amplifiers being such that amplifiers for each column of the array fit entirely inside their respective column.

22. The module as claimed in claim 21 wherein, along one or more sides of the array, readout amplifiers are arranged side-by-side at the periphery of the array and, wherein the combined width of readout amplifiers on each side of the array does not exceed the length of the adjacent side of the array.

23. The module as claimed in claim 15 wherein said array of sensors comprises a pixel array.

24. The module as claimed in claim 1 operable in said proximity detection mode when no object is being detected, and to enter said gesture recognition mode following detection of an object.

25. The module of claim 1 as incorporated within one of a mobile computing device, a mobile telephony device or an electronic reader device.

26. A method of proximity detection and gesture recognition, said method comprising:

determining whether there is an object in the proximity of a sensor in a proximity detection mode, and following detection of an object, entering a gesture recognition mode;

wherein said proximity detection mode comprises:

emitting radiation from an illumination source, measuring the level of radiation incident on a plurality of sensors, said level of radiation being attributable to ambient radiation and, when there is an object present in the field of said one or more of said radiation sensors, radiation from said illumination source which has been reflected by said object towards said one or more of said radiation sensors;

adjusting said measured radiation level to cancel the contribution attributable to the ambient radiation, and comparing said adjusted radiation level to a proximity threshold; and wherein said gesture recognition mode comprises:

repeatedly individually sampling the level of radiation incident on a plurality of sensors; and determining the movement of an object in the field of view of said sensors by comparing the changes in the measured radiation levels over a plurality of said samples;

wherein any ambient radiation contribution is not removed from the sampled radiation levels during said gesture recognition mode.

27. The method as claimed in claim 26 wherein, in said gesture recognition mode, said module is operable to detect a gesture made by an object without making contact to a surface or other object.

28. The method as claimed in claim 26 wherein said emitted radiation is pulsed; and the one or more radiation sensors detect the level of radiation incident thereon both when the illumination source is on and when the illumination source is off; using the measured radiation level when the illumination source is on and the measured radiation level when the illumination source is off in said cancelling of the contribution of the measured radiation level attributable to the ambient radiation.

29. The method as claimed in claim 26, wherein said gesture recognition mode further comprises:

determining ambient radiation level;

comparing said ambient radiation level to a ambient threshold, and activating said illumination source if said ambient radiation level is below said ambient threshold.

30. The method as claimed in claim 26 wherein, said gesture recognition mode comprises integrating the incident radiation on said plurality of sensors during an integration time.

31. The method as claimed in claim 30 comprising repeating said integration of the incident radiation with an increased integration time if it determined that the sampled radiation levels of all the sensors are all below a first integration threshold; and/or repeating the integration of the incident radiation with a reduced integration time if it determined that the sampled radiation levels of at least one of the sensors is above a second integration threshold.

32. The method as claimed in claim 26 wherein said gesture recognition mode comprises obtaining a two dimensional image from the sampled radiation level for each sample, and determining the motion of the object in two-dimensions from changes in this image between samples.

33. The method as claimed in claim 26 wherein said proximity detection mode comprises combining the outputs of said plurality of radiation sensors, or a subset thereof, into a single output.

34. The method as claimed in claim 26 wherein said gesture sensing mode comprises exposing every sensor simultaneously during each of said samples.

35. The method as claimed in claim 34 wherein the capacitance of the sensor's photodiode is used to obtain an output voltage for the sensor.

36. The method as claimed in claim 35 comprising comparing said output voltage to a time varying reference signal inside of the sensor.

37. The method as claimed in claim 26 wherein said gesture sensing mode comprises exposing said sensors a row at a time during each of said samples.

38. The method as claimed in claim 26 wherein, should the object no longer be detected when in said gesture recognition mode, said device enters said proximity detection mode.

39. The method of claim 26 implemented as computing program instructions stored on a program carrier, said instructions, when executed on suitable computing apparatus, causing said apparatus to perform said method.

* * * * *